(12) United States Patent
Merrien et al.

(10) Patent No.: US 9,462,475 B2
(45) Date of Patent: *Oct. 4, 2016

(54) UICCS EMBEDDED IN TERMINALS OR REMOVABLE THEREFROM

(71) Applicant: GEMALTO SA, Meudon (FR)

(72) Inventors: Lionel Merrien, Montreal (CA); Xavier Berard, Cadolive (FR); Pierre Girard, La Destrousse (FR); Philippe Proust, Marseilles (FR); Fabrice Vergnes, Fuveau (FR); Frédéric Faria, La Ciotat Cedex (FR); Franck Imoucha, Auriol (FR)

(73) Assignee: GEMALTO SA, Meudon (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/603,889

(22) Filed: Jan. 23, 2015

(65) Prior Publication Data

US 2015/0134958 A1    May 14, 2015

Related U.S. Application Data

(62) Division of application No. 13/312,309, filed on Dec. 6, 2011.

(30) Foreign Application Priority Data

Dec. 6, 2010   (EP) .................................... 10306359

(51) Int. Cl.
*H04W 12/06*   (2009.01)
*H04W 12/08*   (2009.01)
(Continued)

(52) U.S. Cl.
CPC ........... *H04W 12/08* (2013.01); *H04B 1/3816* (2013.01); *H04L 9/0825* (2013.01); *H04L 63/0428* (2013.01); *H04L 63/123* (2013.01);
(Continued)

(58) Field of Classification Search
CPC .... H04L 63/123; H04W 12/06; H04W 12/04
See application file for complete search history.

(56) References Cited

U.S. PATENT DOCUMENTS 6,978,152 B1   12/2005   Yamaashi et al.
7,024,390 B1   4/2006   Mori et al.
(Continued)

FOREIGN PATENT DOCUMENTS

CN   101080051 A   11/2007
CN   101179401 A   5/2008
(Continued)

OTHER PUBLICATIONS

Search Report issued on Jul. 22, 2011, by European Patent Office for Application No. 10306359.
(Continued)

*Primary Examiner* — Myron K Wyche
(74) *Attorney, Agent, or Firm* — Buchanan Ingersoll & Rooney PC

(57) ABSTRACT

The invention proposes several improvements related to the management of secure elements, like UICCs embedding Sim applications, these secure elements being installed, fixedly or not, in terminals, like for example mobile phones. In some cases, the terminals are constituted by machines that communicate with other machines for M2M (Machine to Machine) applications.

7 Claims, 8 Drawing Sheets

(51) Int. Cl.
- *H04W 4/00* (2009.01)
- *H04W 12/04* (2009.01)
- *H04L 29/08* (2006.01)
- *H04L 9/08* (2006.01)
- *H04W 8/22* (2009.01)
- *H04B 1/3816* (2015.01)
- *H04W 8/18* (2009.01)
- *H04W 8/20* (2009.01)
- *H04L 29/06* (2006.01)
- *H04W 84/04* (2009.01)

(52) U.S. Cl.
CPC .......... *H04L 67/34* (2013.01); *H04W 4/001* (2013.01); *H04W 4/003* (2013.01); *H04W 4/005* (2013.01); *H04W 8/183* (2013.01); *H04W 8/22* (2013.01); *H04W 12/04* (2013.01); *H04W 12/06* (2013.01); *H04L 63/083* (2013.01); *H04W 8/18* (2013.01); *H04W 8/205* (2013.01); *H04W 84/04* (2013.01)

(56) References Cited

U.S. PATENT DOCUMENTS

| | | |
|---|---|---|
| 7,146,161 B2 | 12/2006 | Chou |
| 7,349,719 B2 | 3/2008 | Buniatyan |
| 7,363,056 B2 | 4/2008 | Faisy |
| 9,092,775 B2 | 7/2015 | Bernard et al. |
| 2002/0186845 A1 | 12/2002 | Dutta et al. |
| 2004/0131186 A1 | 7/2004 | Kasuya et al. |
| 2004/0235523 A1 | 11/2004 | Schrire et al. |
| 2005/0021875 A1 | 1/2005 | Bouthemy et al. |
| 2005/0164737 A1 | 7/2005 | Brown |
| 2005/0186954 A1 | 8/2005 | Kenney |
| 2005/0239504 A1 | 10/2005 | Ishii et al. |
| 2005/0266883 A1 | 12/2005 | Chatrath |
| 2005/0279826 A1 | 12/2005 | Merrien |
| 2006/0049243 A1 | 3/2006 | Sakamura et al. |
| 2006/0079284 A1 | 4/2006 | Lu et al. |
| 2006/0086785 A1 | 4/2006 | Sakata |
| 2006/0196931 A1 | 9/2006 | Holtmanns et al. |
| 2006/0199614 A1 | 9/2006 | Hyacinthe |
| 2007/0105532 A1 | 5/2007 | Martin et al. |
| 2007/0239857 A1 | 10/2007 | Mahalal et al. |
| 2008/0090614 A1 | 4/2008 | Sicher et al. |
| 2008/0130879 A1 | 6/2008 | Heinonen et al. |
| 2008/0261561 A1* | 10/2008 | Gehrmann ............ H04W 8/205 455/411 |
| 2008/0292074 A1 | 11/2008 | Boni et al. |
| 2008/0319823 A1 | 12/2008 | Ahn et al. |
| 2009/0159692 A1 | 6/2009 | Chew et al. |
| 2009/0163175 A1 | 6/2009 | Shi et al. |
| 2009/0191857 A1 | 7/2009 | Horn et al. |
| 2009/0191917 A1 | 7/2009 | Zappulla et al. |
| 2009/0191918 A1 | 7/2009 | Mardiks |
| 2009/0215431 A1 | 8/2009 | Koraichi |
| 2009/0217348 A1 | 8/2009 | Salmela et al. |
| 2009/0307142 A1 | 12/2009 | Mardikar |
| 2010/0179907 A1 | 7/2010 | Atkinson |
| 2011/0028126 A1 | 2/2011 | Lim et al. |
| 2011/0035584 A1 | 2/2011 | Meyerstein et al. |
| 2011/0059773 A1 | 3/2011 | Neumann et al. |
| 2011/0081950 A1 | 4/2011 | Guven |
| 2011/0126183 A1 | 5/2011 | Bernard et al. |
| 2011/0136482 A1 | 6/2011 | Kaliner |
| 2011/0237190 A1* | 9/2011 | Jolivet ................. H04B 5/0081 455/41.2 |
| 2011/0302641 A1 | 12/2011 | Hald et al. |
| 2011/0320600 A1 | 12/2011 | Froeding et al. |
| 2012/0028609 A1 | 2/2012 | Hruska |
| 2012/0108295 A1 | 5/2012 | Schell et al. |
| 2012/0113865 A1 | 5/2012 | Zhao et al. |
| 2012/0297473 A1 | 11/2012 | Case et al. |
| 2013/0318355 A1 | 11/2013 | Girard et al. |
| 2013/0324091 A1 | 12/2013 | Girard et al. |
| 2013/0329683 A1 | 12/2013 | Berard et al. |
| 2014/0019760 A1 | 1/2014 | Vergnes et al. |
| 2014/0024343 A1 | 1/2014 | Bradley |
| 2014/0031083 A1 | 1/2014 | Vergnes et al. |
| 2014/0057680 A1 | 2/2014 | Proust et al. |
| 2014/0066011 A1 | 3/2014 | Bradley |
| 2014/0122872 A1 | 5/2014 | Merrien et al. |
| 2014/0141747 A1 | 5/2014 | Merrien et al. |

FOREIGN PATENT DOCUMENTS

| | | | |
|---|---|---|---|
| CN | 101309518 A | 11/2008 | |
| DE | 10 2008 033 976 A1 | 1/2010 | |
| EP | 1 650 717 A1 | 4/2006 | |
| EP | 1 965 596 A1 | 9/2008 | |
| EP | 2 056 523 A1 | 5/2009 | |
| EP | 2 076 071 A1 | 7/2009 | |
| FR | 2 871 020 A1 | 12/2005 | |
| GB | 2457221 | * 12/2009 | ............ G06F 21/00 |
| JP | 2002-236572 A | 8/2002 | |
| JP | 2005-323128 A | 11/2005 | |
| JP | 2006-050554 A | 2/2006 | |
| JP | 2006-107316 A | 4/2006 | |
| JP | 2007-019897 A | 1/2007 | |
| JP | 2007-513534 A | 5/2007 | |
| JP | 2007-201883 A | 8/2007 | |
| JP | 2007-235492 A | 9/2007 | |
| JP | 2008-131469 A | 6/2008 | |
| JP | 2008-519343 A | 6/2008 | |
| JP | 2009-037602 A | 2/2009 | |
| JP | 2009-038598 A | 2/2009 | |
| JP | 2010-501092 A | 1/2010 | |
| JP | 2010-532107 A | 9/2010 | |
| JP | 2011-525311 A | 9/2011 | |
| JP | 2012-528534 A | 11/2012 | |
| KR | 2002-0066032 A | 8/2002 | |
| KR | 2003-0044260 A | 6/2003 | |
| KR | 10-0489783 B1 | 5/2005 | |
| KR | 10-2005-0095424 A | 9/2005 | |
| KR | 2007-0095048 A | 9/2007 | |
| KR | 10-2008-0014285 A | 2/2008 | |
| KR | 10-2008-0015870 A | 2/2008 | |
| KR | 10-2009-0056019 A | 6/2009 | |
| KR | 10-2010-0095648 A | 8/2010 | |
| KR | 10-2010-011642 A | 10/2010 | |
| WO | WO 02/082715 A1 | 10/2002 | |
| WO | WO 03/104997 A1 | 12/2003 | |
| WO | WO 2004/021296 A1 | 3/2004 | |
| WO | 2004/105421 A2 | 12/2004 | |
| WO | WO 2007/058241 A1 | 5/2007 | |
| WO | WO 2008/123827 A1 | 10/2008 | |
| WO | WO 2008/128874 A1 | 10/2008 | |
| WO | WO 2009/055910 A1 | 5/2009 | |
| WO | 2009/092115 A2 | 7/2009 | |
| WO | WO 2009/091837 A1 | 7/2009 | |
| WO | WO 2009/095295 A1 | 8/2009 | |
| WO | WO 2009/103623 A2 | 8/2009 | |
| WO | WO 2009/141024 A1 | 11/2009 | |
| WO | WO 2009/141035 A1 | 11/2009 | |
| WO | 2009/149788 A2 | 12/2009 | |
| WO | 2010/052332 A1 | 5/2010 | |
| WO | 2010068016 A3 | 6/2010 | |
| WO | WO 2010/138592 A2 | 12/2010 | |
| WO | WO 2011/139795 A1 | 11/2011 | |
| WO | WO 2011/159549 A1 | 12/2011 | |
| WO | WO 2012/012526 A1 | 1/2012 | |
| WO | WO 2012/058092 A1 | 5/2012 | |
| WO | WO 2012/058099 A1 | 5/2012 | |
| WO | WO 2012/058429 A1 | 5/2012 | |
| WO | WO 2012/058446 A1 | 5/2012 | |
| WO | WO 2012/058450 A1 | 5/2012 | |
| WO | WO 2012/061516 A1 | 5/2012 | |

(56) References Cited

FOREIGN PATENT DOCUMENTS

WO   WO 2012/061561 A2   5/2012
WO   WO 2012/065112 A2   5/2012

OTHER PUBLICATIONS

International Search Report (Form PCT/ISA/210) and the Written Opinion of the International Searching Authority (Form PCT/ISA/237) issued on Feb. 27, 2012, by the European Patent Office in the International Application No. PCT/EP2011/071660. (6 pages).
An English Translation of the Office Action (Notice of Reasons for Rejection) issued on Apr. 15, 2014, by the Japan Patent Office in the Japanese Patent Application No. 2013-542477. (3 pages).
"3rd Generation Partnership Project; Technical Specification Group Services and System Aspects; 3G Security; Specification of the Milenage Algorithm Set; An example algorithm set for the 3GPP authentication and key generation functions f1, f1*, f2, f3, f4, f5 and f5*; Document 2: Algorithm Specification (Release 11)", 3GPP TS 35.206 V11.0.0 (Sep. 2012), pp. 1-31.
"3rd Generation Partnership Project; Technical Specification Group Services and System Aspects; Feasibility Study on Remote Management of USIM Application on M2M Equipment; (Release 8)", 3GPP TR 33.812 V1.0.0 (Sep. 2008), pp. 1-80.
International Search Report (Form PCT/ISA/210) and the Written Opinion of the International Searching Authority (Form PCT/ISA/237) issued on Feb. 22, 2012, by the European Patent Office in the International Application No. PCT/EP2011/071674. (8 pages).
Madlmayr et al., "The Benefit of using SIM Application Toolkit in the Context of Near Field Communication Applications" International Conference on the Management of Mobile Business, (Jul. 2007), (8 pages).
International Search Report (Form PCT/ISA/210) and the Written Opinion of the International Searching Authority (Form PCT/ISA/237) issued on Mar. 28, 2012, by the European Patent Office in the International Application No. PCT/EP2011/071737. (6 pages).
An English Translation of the Office Action (Notice of Reasons for Rejection) issued on Jun. 17, 2014, by the Japan Patent Office in the Japanese Patent Application No. 2013-542492. (3 pages).
International Search Report (Form PCT/ISA/210) and the Written Opinion of the International Searching Authority (Form PCT/ISA/237) issued on Feb. 15, 2012, by the European Patent Office in the International Application No. PCT/EP2011/071778. (9 pages).
An English Translation of the Office Action (Notice of Reasons for Rejection) issued on Apr. 30, 2014, by the Japan Patent Office in the Japanese Patent Application No. 2013-542496. (2 pages).
International Search Report (Form PCT/ISA/210) and the Written Opinion of the International Searching Authority (Form PCT/ISA/237) issued on Feb. 27, 2012, by the European Patent Office in the International Application No. PCT/EP2011/071781. (11 pages).
"Smart Cards; Card Application Toolkit (CAT) (Release 9)", ETSI TS 102 223, vol. SCP TEC, No. V9.2.0, (Oct. 1, 2010), pp. 1-209.
IP Based Over-the Air Handset Configuration Management (IOTA-HCM), 3rd Generation Partnership Project 2 "3GPP2", 3GPP2 C.S0040, Version 1.0, Jul. 18, 2003, pp. 1-68.
International Search Report (Form PCT/ISA/210) and the Written Opinion of the International Searching Authority (Form PCT/ISA/237) issued on Feb. 22, 2012, by the European Patent Office in the International Application No. PCT/EP2011/071675. (12 pages).
International Search Report (Form PCT/ISA/210) and the Written Opinion of the International Searching Authority (Form PCT/ISA/237) issued on Apr. 4, 2012, by the European Patent Office in the International Application No. PCT/EP2011/071731. (12 pages).
"3rd Generation Partnership Project; Technical Specification Group Services and System Aspects; Service aspects; Service principles (Release 11)", 3GPP TS 22.101 V11.0.0 (Sep. 2010), pp. 1-60.
International Search Report (Form PCT/ISA/210) and the Written Opinion of the International Authority (Form PCT/ISA/237) issued on Apr. 16, 2012, by the European Patent Office in the International Application No. PCT/EP2011/071919. (7 pages).
International Search Report (Form PCT/ISA/210) and the Written Opinion of the International Searching Authority (Form PCT/ISA/237) issued on Feb. 27, 2012, by the European Patent Office in the International Application No. PCT/EP2011/071664. (8 pages).
Written Opinion of the International Preliminary Examining Authority (Form PCT/IPEA/408) issued on Dec. 13, 2012, by the European Patent Office in the International Application No. PCT/EP2011/071664. (5 pages).
Notification of Transmittal of the International Preliminary Report on Patentability (Forms PCT/IPEA/416 and PCT/IPEA/409) issued on Mar. 8, 2013, by the European Patent Office in the International Application No. PCT/EP2011/071664. (14 pages).
International Search Report (Form PCT/ISA/210) and the Written Opinion of the International Searching Authority (Form PCT/ISA/237) issued on Apr. 12, 2012, by the European Patent Office in the International Application No. PCT/EP2011/071695 and comments filed by the Applicant on May 31, 2012. (10 pages).
International Search Report (Form PCT/ISA/210) and the Written Opinion of the International Searching Authority (Form PCT/ISA/237) issued on Apr. 5, 2012, by the European Patent Office in the International Application No. PCT/EP2011/071785. (9 pages).
Vergnes et al., U.S. Appl. No. 13/992,103, entitle "Method for Exporting Data of a Javacard Application Stored in a UICC to a Host" filed Jun. 6, 2013.
Office Action (Notice of Reasons for Rejection) issued on Aug. 19, 2014, by the Japan Patent Office in Japanese Patent Application No. 2013-542497, and an English Translation of the Office Action. (9 pages).
Office Action (Notice of Preliminary Rejection) issued on Jun. 27, 2014, by the Korean Intellectual Property Office in Korean Patent Application No. 10-2013-7017637, and an English Translation of the Office Action. (7 pages).
Office Action (Notice of Preliminary Rejection) issued on Aug. 19, 2014, by the Korean Intellectual Property Office in Korean Patent Application No. 10-2013-7016486, and an English Translation of the Office Action. (6 pages).
Office Action (Notice of Reasons for Rejection) issued on Aug. 5, 2014, by the Japan Patent Office in corresponding Japanese Patent Application No. 2013-542474, and an English Translation of the Office Action. (4 pages).
Office Action issued by the U.S. Patent and Trademark Office in the U.S. Appl. No. 13/991,823, mailed Jan. 5, 2015, U.S. Patent and Trademark Office, Alexandria, VA. (25 pages).
Office Action issued by the U.S. Patent and Trademark Office in the U.S. Appl. No. 13/991,846, mailed Feb. 10, 2015, U.S. Patent and Trademark Office, Alexandria, VA. (26 pages).
Office Action issued by the U.S. Patent and Trademark Office in the U.S. Appl. No. 13/992,065, mailed Dec. 18, 2014, U.S. Patent and Trademark Office, Alexandria, VA. (26 pages).
Office Action issued by the U.S. Patent and Trademark Office in the U.S. Appl. No. 13/991,744, mailed Dec. 12, 2014, U.S. Patent and Trademark Office, Alexandria, VA. (33 pages).
Notice of Allowance issued by the U.S. Patent and Trademark Office in the U.S. Appl. No. 13/991,752, mailed Jan. 21, 2015, U.S. Patent and Trademark Office, Alexandria, VA. (30 pages).
Office Action issued by the U.S. Patent and Trademark Office in the U.S. Appl. No. 13/991,744, mailed Jun. 2, 2015, U.S. Patent and Trademark Office, Alexandria, VA. (35 pages).
Office Action issued by the U.S. Patent and Trademark Office in the U.S. Appl. No. 13/991,689, mailed Jun. 18, 2015, U.S. Patent and Trademark Office, Alexandria, VA. (46 pages).
Office Action issued by the U.S. Patent and Trademark Office in the U.S. Appl. No. 13/991,823, mailed Jul. 13, 2015, U.S. Patent and Trademark Office, Alexandria, VA. (21 pages).
Office Action issued by the U.S. Patent and Trademark Office in the U.S. Appl. No. 13/991,912, mailed Jul. 23, 2015, U.S. Patent and Trademark Office, Alexandria, VA. (45 pages).
Office Action issued by the U.S. Patent and Trademark Office in the U.S. Appl. No. 13/992,103, mailed Jul. 13, 2015, U.S. Patent and Trademark Office, Alexandria, VA. (42 pages).
Office Action issued by the U.S. Patent and Trademark Office in the U.S. Appl. No. 13/992,065, mailed Jul. 30, 2015, U.S. Patent and Trademark Office, Alexandria, VA. (32 pages).

(56) References Cited

OTHER PUBLICATIONS

Office Action issued by the U.S. Patent and Trademark Office in the U.S. Appl. No. 13/991,766, mailed Mar. 17, 2015, U.S. Patent and Trademark Office, Alexandria, VA. (33 pages).

Office Action issued by the U.S. Patent and Trademark Office in the U.S. Appl. No. 13/992,039, mailed Mar. 17, 2015, U.S. Patent and Trademark Office, Alexandria, VA. (35 pages).

Office Action (Notice of Preliminary Rejection) issued on Feb. 25, 2015, by the Korean Patent Office in Korean Patent Application No. 10-2013-0717638, and an English Translation of the Office Action. (7 pages).

English translation of Office Action issued by the Korean Patent Office on Aug. 28, 2014 in corresponding Korean Application No. 10-2013-7016004. (3 pages).

English translation of Office Action issued by the Korean Patent Office on Apr. 16, 2015 in corresponding Korean Application No. 10-2013-7016004. (2 pages).

Office Action issued by the Russian Patent Office dated Dec. 29, 2014 in corresponding Russian Application No. 2013131034, and English translation of Office Action. (6 pages).

Office Action (Notice of Reasons for Rejection) issued on Feb. 2, 2016, by the Japanese Patent Office in Japanese Patent Application No. 2015-018547, and an English Translation of the Office Action. (5 pages).

Office Action issued by the U.S. Patent and Trademark Office in the U.S. Appl. No. 13/991,766, mailed Oct. 1, 2015, U.S. Patent and Trademark Office, Alexandria, VA. (27 pages).

Office Action issued by the U.S. Patent and Trademark Office in the U.S. Appl. No. 13/992,039, mailed Oct. 1, 2015, U.S. Patent and Trademark Office, Alexandria, VA. (28 pages).

Office Action issued by the U.S. Patent and Trademark Office in the U.S. Appl. No. 13/991,846, mailed Oct. 15, 2015, U.S. Patent and Trademark Office, Alexandria, VA. (23 pages).

Office Action issued by the Chinese Patent Office on Aug. 27, 2015 in corresponding Chinese Application No. 201180058683.0, and English language translation of Office Action. (17 pages).

Office Action issued by the U.S. Patent and Trademark Office in the U.S. Appl. No. 13/992,103, mailed Mar. 30, 2016, U.S. Patent and Trademark Office, Alexandria, VA. (15 pages).

Office Action issued by the U.S. Patent and Trademark Office in the U.S. Appl. No. 13/991,846, mailed Apr. 5, 2016, U.S. Patent and Trademark Office, Alexandria, VA. (24 pages).

Office Action issued by the U.S. Patent and Trademark Office in U.S. Appl. No. 13/992,103, mailed Nov. 25, 2015, U.S. Patent and Trademark Office, Alexandria, VA (22 pages).

Office Action issued Nov. 17, 2015 by the Chinese Patent Office in corresponding Chinese Patent Application No. 201180058925.6 (10 pages).

Office Action issued by the Chinese Patent Office on Aug. 19, 2015 in corresponding Chinese Application No. 201180058922.2, and English language translation of Office Action (16 pages).

Office Action issued by the Chinese Patent Office on Nov. 4, 2015 in corresponding Chinese Application No. 201180058688.3 (5 pages).

3GPP TS 22.101 V11.0.0 (Sep. 2010).

European Office Action dated Dec. 23, 2015 issued in corresponding European Patent Appln. No. 11 810 809.1 (5 pages).

European Office Action dated Jan. 19, 2016 issued in corresponding European Patent Appln. No. 11 811 335.6 (6 pages).

Japanese Office Action dated Jan. 5, 2016 issued in corresponding Japanese Patent Appln. No. 2015-082449, with English translation (5 pages).

Japanese Office Action dated Jan. 19, 2016 issued in corresponding Japanese Patent Appln. No. 2013-054275 with English translation (14 pages).

U.S. Office Action dated Feb. 1, 2016 issued in corresponding U.S. Appl. No. 13/991,823 (15 pages).

U.S. Office Action dated Feb. 2, 2016 issued in corresponding U.S. Appl. No. 13/991,912 (30 pages).

U.S. Office Action dated Feb. 2, 2016 issued in corresponding U.S. Appl. No. 13/992,039 (24 pages).

U.S. Office Action dated Feb. 10, 2016 issued in corresponding U.S. Appl. No. 13/992,065 (23 pages).

\* cited by examiner

UICCS EMBEDDED IN TERMINALS OR REMOVABLE THEREFROM

BACKGROUND

The present improvements concern different topics related to the management of secure elements, like UICCs embedding Sim applications, these secure elements being installed, fixedly or not, in terminals, like for example mobile phones. In some cases, the terminals are constituted by machines that communicate with other machines for M2M (Machine to Machine) applications.

A UICC (Universal Integrated Circuit Card) can be in the format of a smart card, or may be in any other format such as for example but not limited to a packaged chip as described in PCT/SE2008/050380, or any other format. It can be used in mobile terminals in GSM and UMTS networks for instance. The UICC ensures network authentication, integrity and security of all kinds of personal data.

In a GSM network, the UICC contains mainly a SIM application and in a UMTS network it is the USIM application. A UICC may contain several other applications, making it possible for the same smart card to give access to both GSM and UMTS networks, and also provide storage of a phone book and other applications. It is also possible to access a GSM network using an USIM application and it is possible to access UMTS networks using a SIM application with mobile terminals prepared for this. With the UMTS release 5 and later stage network like LTE, a new application, the IP multimedia Services Identity Module (ISIM) is required for services in the IMS (IP Multimedia Subsystem). The telephone book is a separate application and not part of either subscription information module.

In a CDMA network, the UICC contains a CSIM application, in addition to 3GPP USIM and SIM applications. A card with all three features is called a removable user identity card, or R-UIM. Thus, the R-UIM card can be inserted into CDMA, GSM, or UMTS handsets, and will work in all three cases.

In 2G networks, the SIM card and SIM application were bound together, so that "SIM card" could mean the physical card, or any physical card with the SIM application.

The UICC smart card consists of a CPU, ROM, RAM, EEPROM and I/O circuits. Early versions consisted of the whole full-size (85×54 mm, ISO/IEC 7810 ID-1) smart card. Soon the race for smaller telephones called for a smaller version of the card.

Since the card slot is standardized, a subscriber can easily move their wireless account and phone number from one handset to another. This will also transfer their phone book and text messages. Similarly, usually a subscriber can change carriers by inserting a new carrier's UICC card into their existing handset. However, it is not always possible because some carriers (e.g. in U.S.) SIM-LOCK the phones that they sell, thus preventing competitor carriers' cards being used.

The integration of the ETSI framework and the Application management framework of Global Platform is standardized in the UICC configuration.

UICCs are standardized by 3GPP and ETSI.

A UICC can normally be removed from a mobile terminal, for example when the user wants to change his mobile terminal. After having inserted his UICC in his new terminal, the user will still have access to his applications, contacts and credentials (network operator).

It is also known to solder or weld the UICC in a terminal, in order to get it dependent of this terminal. This is done in M2M (Machine to Machine) applications. The same objective is reached when a chip (a secure element) containing the SIM or USIM applications and files is contained in the terminal. The chip is for example soldered to the motherboard of the terminal or machine and constitutes an UICC.

Some of the further disclosed improvements apply to such soldered UICCs or to such chips containing the same applications than the chips comprised in UICCs. A parallel can be done for UICCs that are not totally linked to devices but that are removable with difficulty because they are not intended to be removed, located in terminals that are distant or deeply integrated in machines. A special form factor of the UICC (very small for example and therefore not easy to handle) can also be a reason to consider it as in fact integrated in a terminal. The same applies when a UICC is integrated in a machine that is not intended to be opened.

In the next description, welded UICCs or chips containing or designed to contain the same applications than UICCs will generally be called embedded UICCs or embedded secure elements (in contrast to removable UICCs or removable secure elements). This will also apply to UICCs or secure elements that are removable with difficulty.

The first improvement concerns the authentication of the end user of a terminal during SIM application transfer. In a given context, an entire Sim application (meaning personal data, file system, Java applications like bank applications for example, and secrets) is stored in an embedded UICC comprised in a first terminal (for example soldered in a first mobile phone) and a user wishes to transfer this entire Sim application in another embedded UICC comprised in a second terminal (for example constituted by a second mobile terminal). This can happen when a user changes his mobile phone but does not want to lose the applications, contacts and personal data such as photographs, videos or songs stored in the UICC of his first mobile phone.

Such a problem does not occur when the Sim application is stored in a Sim card that can be removed from a mobile phone and inserted in another one since when a secure element like a UICC is soldered onto the mobile phone, it is not possible to physically change the secure element, containing the SIM application, from a mobile phone to another one.

The general process to achieve this operation of transfer of the Sim application could normally be the following:

The secure element packages the installed SIM in a way it can be reinstalled on another secure element. This packaging must be secured, meaning, ciphered in order than only the targeted secure element is able to read it, and signed in order to ensure that the package comes from the initial secure element;

The packaged SIM is uploaded to a secure vault on the cloud (Internet). This operation may be required in the case the targeted secure element is not known at the packaging time;

The packaged SIM is downloaded to the targeted new secure element;

The targeted secure element performs security checking and then can install the downloaded packaged SIM.

The result is that the initial complete Sim has been transferred in another secure element, with the whole user environment.

A similar method is disclosed in US2005/0266883 from Nokia Corporation.

When initiating the initial transfer from initial secure element up to the secure vault, we can imagine that the end user is entering a PIN code to authenticate himself and confirm the operation. But a problem occurs when it is desired to transfer the packaged SIM again from secure vault to the targeted secure element: How to be sure that the request is coming from the same end user? There is no possibility to enter again the PIN code as it is part of the SIM application and it is necessary to be sure of the identity of the end user before installing the SIM in the targeted new secure element. This problem could lead to the fact that the subscription carried with the SIM could be installed and reused by another user.

In order to avoid this problem, it could be possible to first install the SIM in the targeted secure element and then to request for PIN authentication. However, the drawback is that installation of the Sim has been made and the authentication is not strong since, for a PIN code on 4 digits, after maximum 10.000 trials, a dishonest person could find the correct PIN code and use the Sim application of another user (and consequently his subscription).

This improvement has the purpose to solve this problem.

SUMMARY

In this respect, the present improvement proposes a method for transmitting a Sim application of a first terminal to a second terminal, the Sim application being stored in a secure element included in the first terminal, the access to the Sim application being locked by a Pin code. According to this improvement, the method consists in:

i—exporting the Sim application from the first terminal to a distant site, by including the Pin code as well as a remote loading code;

ii—ask to the user of the second terminal to enter the remote loading code in the second terminal;

iii—in the event the remote loading code entered by the user matches the remote loading code that has been exported, authorizing the installation of the Sim application in a secure element of the second terminal, and otherwise, do not install the Sim application in the secure element of the second terminal.

Advantageously, the match of the remote loading codes is checked at the level of the distant site and the match launches the downloading of the Sim application to the secure element of the second terminal and the installation.

Alternatively, the match of the remote loading codes is checked at the level of the second terminal, after the Sim application has been downloaded to the secure element of the second terminal, the match launching the installation of the Sim application in the secure element of the second terminal.

The remote loading code is preferably ciphered.

In a preferred embodiment, the remote loading code is a pass phrase.

Other features of the improvement will emerge from a reading of the following description of a preferred embodiment given by way of non-limiting illustrative example.

The present improvement proposes to request the end-user to enter a remote loading code in addition to the PIN code to confirm the export of the SIM application to a distant site (the secure vault). The remote loading code can for example be a pass phrase.

This pass phrase is ciphered and included in the secure packaged SIM that is uploaded to the secure vault on the cloud. Thus, the secure vault stores the packaged Sim (the subscription comprised in the secure element, the PIN code, the environment, the authentication secrets, the applicative keys (Security Domain), the different keys of the different applications, the PKI keys, the different applications (NFC, bank, . . . ), the ISD (Issuer Security Domain), the file system, . . . ) and the remote loading code in a unique package that can be later downloaded to a new secure element.

Before installing this package to the new secure element, the user of the second terminal comprising the secure element is asked to enter the remote loading code in the second terminal.

If the remote loading code entered by said user matches the remote loading code that has been exported, the installation of the Sim application in the secure element of the second terminal is authorized. Otherwise, the installation is not done.

Two different ways of operating can be used: the first one consists in checking the match of the remote loading codes at the level of the secure vault. If the codes match, the Sim application is downloaded to the secure element and then executed.

The second one consists in checking the match of the remote loading codes at the level of the second terminal, after having downloaded the Sim application in the secure element of the second terminal. If the codes match, the Sim application is installed in the secure element of the second terminal.

After having been installed, the Sim application can be launched by the user by entering his PIN code.

In a preferred embodiment, the remote loading code is enciphered. In the first embodiment, the secure vault unciphers the pass phrase contained in the packaged SIM. In the second embodiment, the secure element does this unciphering.

The improvement permits to enhance the overall security of transfer of the Sim application since it ensures that the SIM application is exported and imported by the same end-user.

The second improvement concerns the export of sensitive data out of a secure component (UICC chip) to be sent into a secure vault (e.g. a secure server), with no risk of cloning the data, and no direct data link between the UICC and the secure server. More precisely, the improvement concerns a method for exporting on a secure server data comprised on a UICC comprised in a terminal.

When changing terminals, like mobile terminals, for example mobile phones, wireless terminals or connected terminals, users want the facility to keep along the services that were enable in their old terminal. These services, such as the cellular services or banking services, are relying on keys and sensitive data loaded in a UICC of the terminal.

If the secure component (UICC) is removable, such as a classic SIM card, and if the new terminal supports such a removable component, then the user can just remove the secure component from the old terminal and insert it in the new terminal.

But if the UICC is not removable (embedded UICC) or if the new terminal does not support this type of component, then there are needs to be a way to move all the keys and data related to that service to the secure component of the new terminal.

Another problem that arises in the case of embedded UICCs is that the old and the new terminal are sometimes not available at the same time. The user wants to secure its sensitive (personal) data and keys before buying his new terminal.

The improvement provides a way to securely export the keys and data related to a service to a secure vault, for further download into another (or the same) terminal, in such a way that the keys and data cannot be cloned.

Furthermore, the improvement addresses the problem that it may not be possible to establish a direct IP link between the secure vault and the secure component.

To this purpose, the present inventive proposes a method for exporting on a secure server data comprised on a UICC comprised in a terminal. The method consists in:

On export request, signing an export request by the UICC, the signed export request being transmitted by the terminal to the server;

Verifying, at the level of the server, the signed export request by comparing the signature and the identity of the UICC;

If the verification is positive, sending by the server an signed export certificate to the UICC via the terminal;

Verifying the export certificate in the UICC and, if positive, preparing an export package containing the data, the export package being signed and encrypted by the UICC;

Sending the export package to the terminal; and set the exported data as "unusable" in the UICC;

Transmitting from the terminal to the server the export package;

Receive the package and verify the signature at the level of the server;

Signing an acknowledgment message and transmit it to the UICC via the terminal;

In the UICC, verifying the acknowledgment message and, if the signature of the server is recognized, destroying the data that have been exported and sending a signed acknowledge message to the server via the terminal;

Verifying the signature of the acknowledge message in the server and, if the signature is recognized, making the data available for a further transfer to a new terminal or UICC.

The UICC is preferably embedded in the terminal and the export request is preceded by a selection of the data to be exported.

The improvement will be better understood by reading the following description of the figures representing preferred embodiments of the present improvement.

DETAILED DESCRIPTION

The improvement integrates an asynchronous connection between the secure component (UICC) and the secure vault constituted for example by a remote server.

Figure 1:
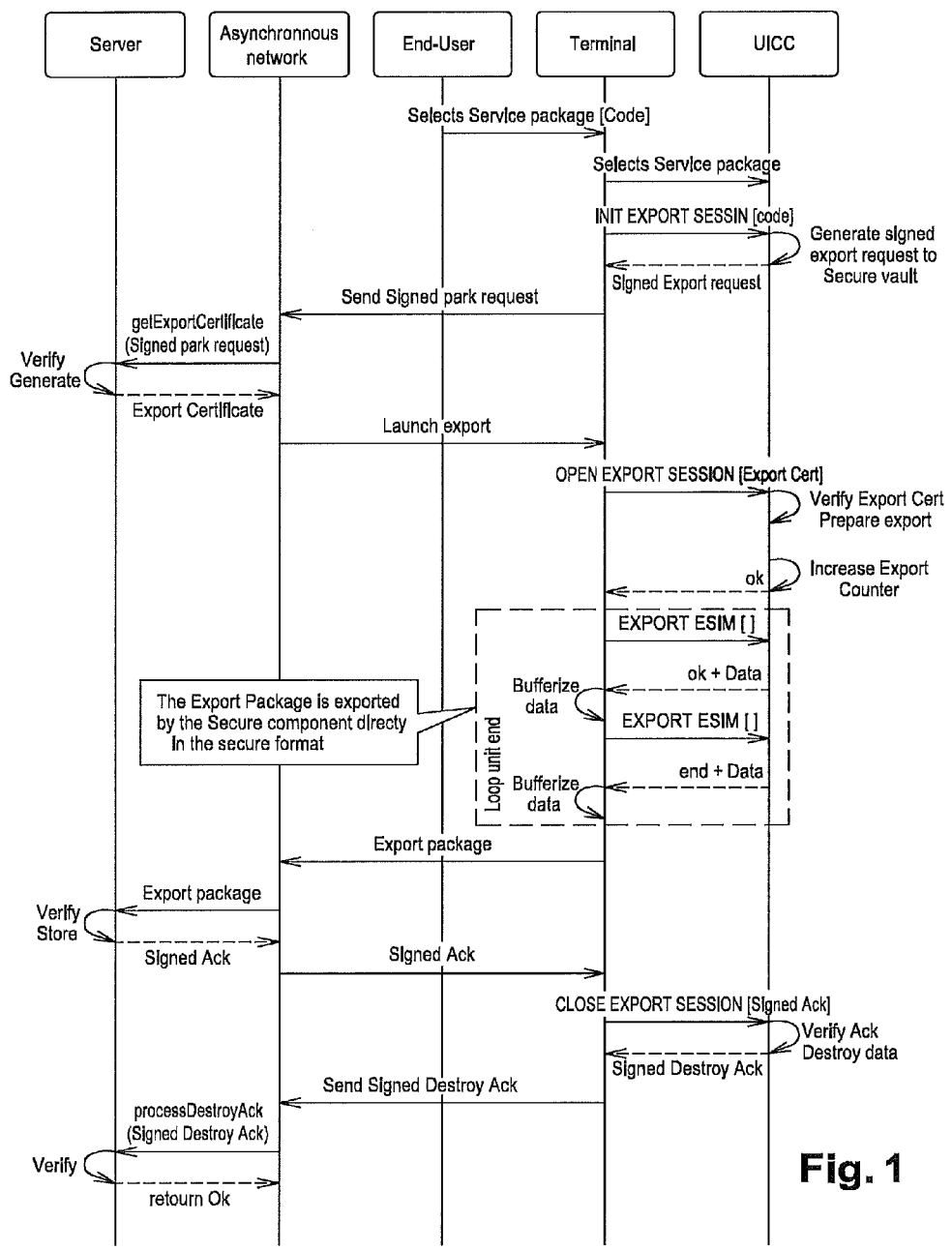
FIG. 1 is a flow chart depicting asynchronous connection of a secure component and a remote server.

In FIG. 1, the end-user of a terminal selects first the data to be exported. These data are for example phone numbers or private keys that the user wants to secure for being able to transfer them later on another (or the same) terminal.

This can be done by selecting an application id or a service id on the UICC. This can be done by the user through an application on the terminal, or automatically through the terminal. This corresponds to an export request formulated by the end-user. Such an export request could also be formulated by the remote server or by the terminal.

Optionally, when selecting the data/service to be exported from the UICC, the user/terminal may have to present a code or to authenticate towards the UICC or the service in order to get access to the data.

The terminal then initiates the export session on the secure component by sending him an "INIT EXPORT SESSION" order.

In response, the UICC returns a "Signed Export request" to the terminal. This request is uniquely identified and signed by the UICC.

The "Signed Export request" is transmitted asynchronously to the server through a network, like an IP, cellular, OTA or OTI network.

At reception, the server verifies the "signed export request", by comparing the signature and the identity of the UICC. The improvement does not mandate any particular security scheme, but requires that the server can verify the signature of the UICC.

The server generates then an "Export Certificate". This certificate is uniquely signed by the server, and uniquely identifies the UICC. With this certificate, the server confirms that the UICC is genuine, and that the export process can be initiated.

The "Export certificate" is transmitted asynchronously to the UICC by the terminal.

The UICC then verifies the "Export Certificate". The improvement does not specify a particular security scheme, but the UICC must have the ability to verify a signature from the server.

The UICC increases an "Export Counter". This counter is maintained by the UICC.

The UICC prepares an "Export Package". This export package is encrypted and signed by the UICC. In addition, the "Export Package" includes the "Export Counter". The Export Package is sent to the terminal. If necessary (as shown in the diagram), due to I/O limitation between the terminal and the UICC, the Export Package can be sent through multiple commands. After having been sent to the terminal, the image of the transmitted package kept at the level of the UICC is rendered inactive (for avoiding a possible duplication of the package).

The "Export Package" is then transmitted asynchronously to the server. Since it is encrypted, only the server can read it.

Once received, the server decrypts and verifies the Export Package. For each UICC, the server maintains a copy of the Export counter. The Export Counter in the Export Package must be higher than the copy of the export counter maintained by the server, otherwise the export package is rejected. Once the export package has been accepted, the server updates its copy of the Export Counter to match the value in the Export Package.

The server then generates a Signed Ack. This Ack is uniquely signed by the server, and includes the value of the export counter. When having sent this command, the received package is rendered inactive at the level of the server.

The Signed Ack is transmitted asynchronously to the UICC (i.e. through the terminal).

The UICC verifies the received Signed Ack and, if it matches, destroys its copy (image) of the data that have been exported.

The UICC then generates a Signed Destroy Ack, which is uniquely signed by the UICC, and includes the value of the export counter.

The Signed Destroy Ack is transmitted asynchronously to the server.

The server then verifies the Signed Destroy Ack. If it matches, the exported data are available to be imported into another UICC in a new terminal or in the same one later.

The advantages of the present improvement are the following:
- At every point of the process, the improvement provides a nice way to interrupt and rollback the process. Therefore there is no risk of losing the data.
- All the process can be done through an asynchronous connection (such as e-mail). There is no need for the UICC to be directly connected to the server.
- It is not possible to have cloned information. The data are available in the server only after confirmation that they have been destroyed in the UICC.

The third improvement relates to the remote management of a secure element like a UICC located on or in a device that can be infected by a malware. This improvement applies to embedded UICCs and to removable UICCs. The term "secure element" will be used in the following description for designating such an UICC.

It is known that, once issued, the secure element needs to be maintained during their whole life. The maintenance usually consists in remote update of the secure element content. It could be a late stage personalization, a code patch, installation of a new functionality, data update, key renewal, etc. . . . . These operations are performed by a remote administration platform that operates through a potentially unsecured network (e.g. the Internet) and a potentially unsecured device to which the secure element is attached.

Figure 2:
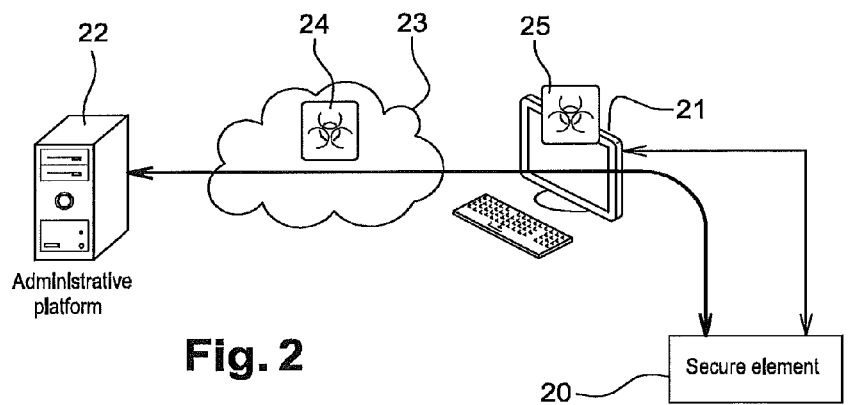
FIG. 2 is a schematic diagram of a system that downloads content from an administrative platform to a secure element.

FIG. 2 represents a system where a secure element comprised in a terminal 21 downloads content from an administrative platform 22 over the Internet 23. Malware 24 can be present at the level of Internet 23 or malware 25 at the level of the terminal 21.

In order to secure the process, there is usually an end-to-end secure communication protocol between the administration platform and the secure element (e.g. one Global Platform protocol). However, in most cases, neither the server nor the secure element has a direct connectivity to each other and there is some middleware on the device that initiate the secure administration session. It is well known that this first session between the middleware and the server has to be secured as well (e.g. with TLS) for multiple reasons (authentication of remote management request, confidentiality of the request, avoiding denial of service, etc. . . . ).

Figure 3:
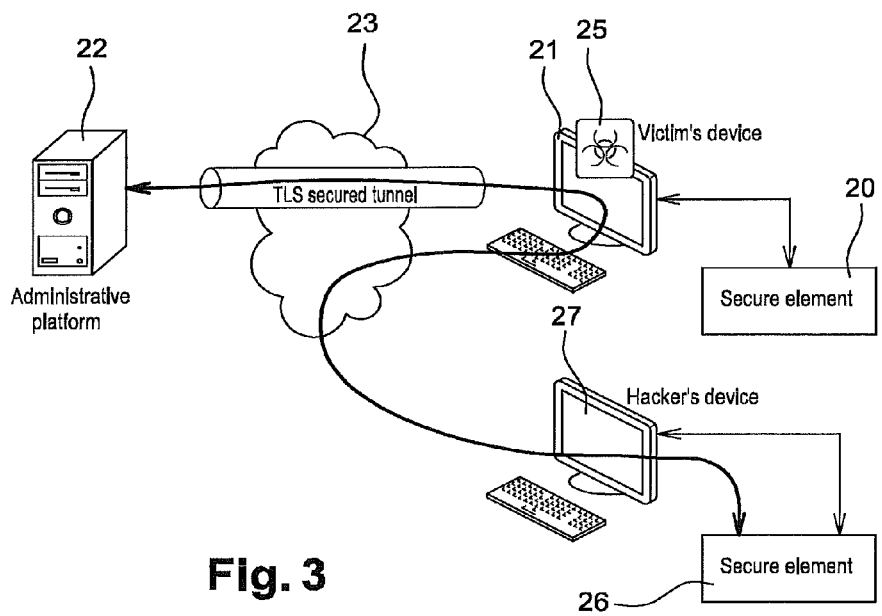
FIG. 3 is a schematic diagram of the system with a hacker's device present.

However, if some malware is located on a terminal, it can be used by a hacker to perform some remote management on its secure element on behalf of the victim's device on which the malware is sitting as depicted in FIG. 3.

In this figure, the malware 25 is located in victim's terminal 21. Even if the channel between the terminal 21 and the administrative platform 22 is secured through TLS, the malware 25 can direct the content (data and software) to another secure element 26 located in a hacker's terminal 27 through the Internet 23. This redirection of the downloaded content can be very harmful for the owner of terminal 21. For example, in the Telecom domain, it can be foreseen to download an entire SIM application on an existing secure element like 20. For that, the user of terminal 21 connects to the administrative platform 22 through the Internet and asks for a subscription to a given MNO (the administrative platform can be connected to different MNOs as it will be seen later). Platform 22 recognises user's terminal 21 and after this identification, prepares the content to be downloaded (Sim application, data, credentials among them IMSI and Ki). If the content is loaded on the secure element 26 of the hacker instead on the secure element 20, the owner of terminal 21 will not only not be able to connect to this MNO's network but he will pay for the hacker's communications.

In addition, the credential used to authenticate the device can be stolen by the malware.

Using the secure element as is to authenticate the device is also difficult for two reasons. Firstly the secure element is under management so it is difficult to use it (especially if it is not personalized or if its personalization is not finished). Secondly, the credential it contains may belong to another entity which is not the one operating the remote management platform.

The present improvement proposes a solution to these problems.

In this respect, the present improvement concerns a method for managing content on a secure element connected to a mobile equipment, the content being managed on the secure element from a distant administrative platform, the method consisting in:
- Establishing, at the level of the administrative platform a secure channel between the mobile equipment and the administrative platform, thanks to session keys generated by the secure element and transmitted to the mobile equipment;
- Transmitting to the administrative platform a request to manage content of the secure element;
- Verifying at the level of the administrative platform that the request originates from the same secure element that has generated the session keys and, if positive, authorizing the management and, if negative, forbid the management.

The aforementioned management consists in at least one of the following tasks:
- Downloading content on the secure element
- Deleting content on the secure element
- Exporting content stored on the secure element
- Activating content stored on the secure element
- Deactivating content stored on the secure element The verification can consist in verifying that the private key used for establishing the secure channel corresponds to a certificate stored on the secure element that has generated the sessions keys.

In another embodiment, the verification consists in verifying that an identifier corresponding to a symmetrical key used for establishing the secure channel corresponds to an identifier stored on the secure element that has generated the session keys.

Figure 4:
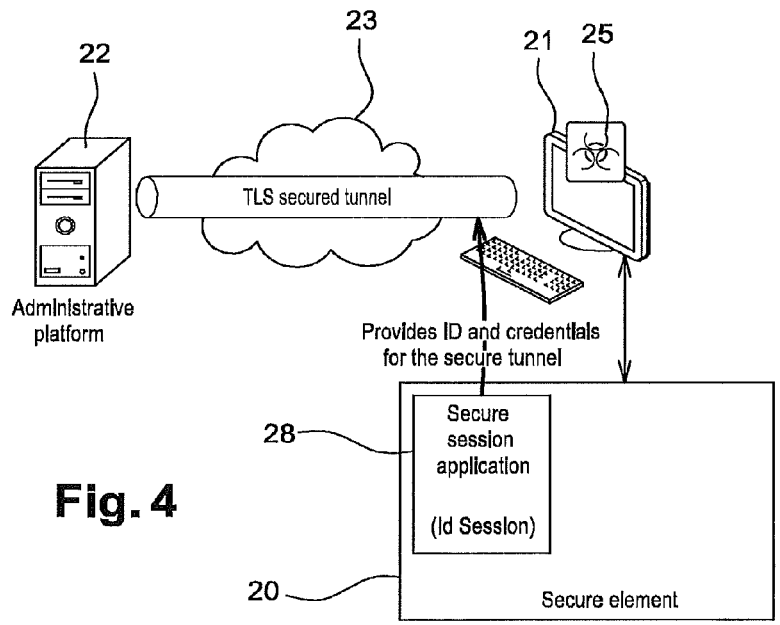
FIGS. 4 and 5 are schematic diagrams of the systems representing the implementation of steps in the disclosed embodiment.
Figure 5:
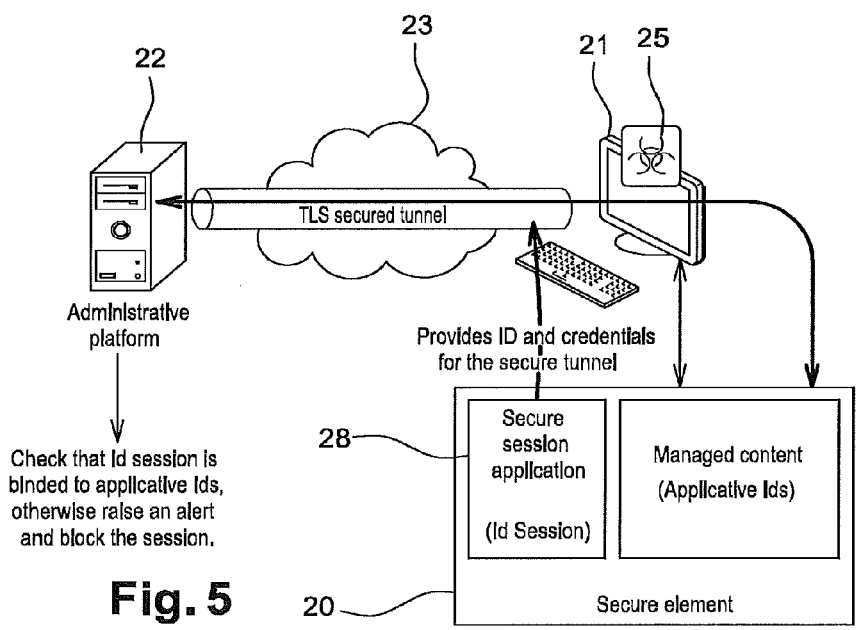

The present improvement will be better understood by reading the following description of the FIGS. 4 and 5 where:

FIG. 4 represents a first step of the method of the present improvement;

FIG. 5 represents a second step of the method of the present improvement;

The improvement proposes to insert in the secure element an independent application which is used to secure the session between the administrative platform and the terminal. After this step, the server verifies the binding between the identity at the device session level and the identity at the secure element remote management.

FIG. 4 represents a first step of the method of the present improvement.

As can be seen, the secure element 20 comprises an application 28 foreseen to provide session keys to the administrative platform 22. These session keys are generated by the application 28 and transmitted to the mobile equipment 21. The application 28 transmits also an identifier or a certificate to the mobile equipment 21:

An identifier is sent from the application 28 to the equipment when a symmetrical encryption is used (on the basis of secret keys) for creating a secure channel between the platform 22 and the equipment 21. The equipment 21 transmits this identifier to the platform 22. The platform 22 then compares the received identifier with identifiers it stores, in order to recognize which application sent the identifier. Once recognized, the platform 22 associates a symmetrical key to the identifier of the application 28. The application 28 and the platform 22 then derive session keys in order to encrypt (for confidentiality reasons) the communication between the equipment 21 and the platform 22. A secure channel has thus been established between the equipment 21 and the platform 22.

Another way to create this secure channel consists in exchanging certificates between the platform 22 and the application 28. The platform authenticates the application 28 by asking it to sign a hash of all the messages already exchanged. The equipment 21 generates a session key and encrypts it for the platform 22. An asymmetric communication (PKI on a TLS secure channel) is then established between the equipment 21 and the platform 22.

In both of the preceding cases a secure channel has been established between the platform and the equipment 21.

The main second step of the improvement consists in verifying the binding between the identity at the device session level and the identity at the secure element remote management.

FIG. 5 represents this step.

A request to manage content of the secure element is sent to the administrative platform. This management consists for example in downloading content on the secure element 20, deleting or exporting content stored on it or activating or deactivating content stored on it. The download of content can for example consist in downloading an entire Sim application on the secure element, with the associated credentials (IMSI, Ki). It can also consist in downloading a phone book in the secure element 20 from the platform 22.

In order to verify this binding, the secure element 20 sends through the established secure channel a fixed identifier, like for example his ICCID or his serial number. The platform 22 verifies that this request originates from the same secure element (for example the session keys used for establishing the secure channel are compared to the fixed identifier). If the check is positive, the management is authorized. On the contrary, if the check is negative, the management is forbidden.

The improvement thus ensures that the secure element that is managed is the correct one and not another secure element linked to the platform by a malware.

The fourth improvement concerns the personalization of a secure element by using another secure element in post-issuance.

Secure personalization of secure elements is a heavy step in industrialization and distribution of services on secure elements.

This improvement proposes to not performing this step in factories but to let the user do it according to its needs.

Credentials' porting from one secure element to the other one has not been possible so far. Until now, it meant replacement of an old secure element by a new secure element already personalized with partial porting of the credentials.

This improvement proposes a method to port credentials from one secure element to another.

The improvement also aims to allow to an end-user to personalize an embedded secure element (embedded UICC) by transferring data to this embedded UICC, after post-issuance. This can for example consist in transferring to the embedded UICC a new application, like a banking application for example.

In case of personalization of an embedded UICC, the improvement proposes a method for personalizing a first secure element comprised in a first terminal, said method consisting in:

Providing the user of the first terminal with a second secure element;
Linking the first and second secure elements in or through the first terminal;
Personalizing securely the first secure element with data comprised in the second secure element, security being based on certificate verification and asymmetric encryption between the secure elements.

In case of transfer of credentials comprised in the first secure element to the second secure element, the first secure element being comprised in a first terminal, the method for transferring credentials consists in:

Linking the first and second secure elements in or through the first terminal;
Transferring securely the credentials from the first secure element to the second secure element, security being based on certificate verification and asymmetric encryption between the secure elements.

The first and second secure elements can be removable or not (embedded UICC). When the second secure element is removable, its form factor can be a Sim card or a dongle for example. It can also be comprised in a so called "smart badge" having a wireless link with the first secure element. It can also be comprised in a mobile terminal, under a non-removable form (embedded UICC).

The personalization can be done in a public area without any network access, by anyone, e.g. the end user, anywhere, e.g. at end user home, and without any connectivity constraint.

This personalization can for example consist in a transfer of credentials (Imsi, Ki) of a banking application from a mobile terminal, for example a mobile phone, to another one.

In a given example, the process for personalization is for example the following:

A user who wishes to personalize his first secure element, for example included in a mobile phone, goes to his bank or to a shop of his mobile network operator and receives a second secure element in the form of a dongle. The dongle contains an application or credentials that have to be transferred to the first secure element. The dongle can also be sent to him per post;
Once at home, the user inserts his dongle in his computer and connects his mobile phone to the computer. The link between the computer and the mobile phone can be wireless (Wifi or Wifi Direct, Bluetooth, NFC, . . . ) or wired.

Thanks to an application comprised in the computer or in the dongle, the application or the credentials that have to be written in the first secure element are transferred to the latter.

Once transferred, the application or the credentials can be used in the first secure element, for example for e-banking.

The improvement also applies to the personalization of a secure element embedded in a terminal, for example in a PC. The second secure element is simply plugged in the PC and the personalization occurs.

For securing the point-to-point personalization, certificate verification and asymmetric encryption are used. The security relies on the second secure element (in any form factor) and the use of a PKI scheme allowing an authentication between the two secure elements.

The personalization happens after the issuance of the secure element to be personalized. This is in particular useful when an end user already owns a secure element, e.g. a smart card in its mobile phone, a banking card, a secure element in a PC, or any other device. When the user needs/wants to transfer its credentials to a brand new secure element, the existing secure element can transfer the credentials contained therein (subscription to a MNO, entire Sim application with IMSI and KI, content of an e-purse, . . . ) to the new secure element. This may happen securely in the field, the user only needs to hold physically both secure elements.

This is also applicable when the end user wants to add a new service provided by any Service Provider on an existing secure element. He can be provided with a secure element able to personalize its first secure element without being required to connect to Internet nor to go in a shop.

The improvement allows also updating the personalization of a secure element post issuance. This is also true for an update of the secure element personalization.

The improvement permits to reduce personalization cost in factories and allows secure post-issuance personalization. The end user does not need to go to the service provider shop, nor to connect to Internet to personalize/update its secure element. Moreover, security is granted by point-to-point personalization relying on two secure elements. This is also simplified by the non connected process (no virus threat).

The fifth improvement concerns the communication to an end user of personalization confidential data of its UICC.

Today, when a UICC card is delivered to a customer, some personalization confidential data such as the associated PIN and PUK codes are also delivered to the customer. As these data are confidential, several communication schemes are used:

Scratch codes (user is sure to be the first one to read the info)

All On card: the codes are written on the card, easy to send and pairing of cards and codes is enforced.

The problem with scratch codes is that the user generally keeps the codes at home and their access is not restricted.

The purpose of the improvement is to secure such codes.

According to this improvement, for delivering confidential data to a user of a mobile terminal containing a UICC, the confidential data being related to the UICC, the confidential data are stored on a storage media that can be read by the mobile terminal, access to the confidential data being enabled by the UICC and conditioned by a security policy implemented by the UICC.

The security policy can comprise means to authenticate the user of the mobile terminal.

The UICC can alternatively comprise a code that permits to read the confidential data.

The improvement enables the customer to access these confidential codes on a storage media securely. This storage media can be delivered through any non-secured physical delivery mean since confidential data are encrypted and can only be read by using the customer UICC. The storage media (in the form of a dongle for example or a SD card) is given or sent to the customer by the MNO. End user is able to read securely the personalization confidential data stored in the storage media by using the UICC (embedded or removable UICC) located in his mobile phone.

The UICC comprises a software that is able to decrypt the personalization data and implement a security policy to access these data:

Decryption shall be done with a secret embedded in the UICC

Security policy may comprise the authentication of the user, for example a code received by another way (post, e-mail, SMS) or the number or the amount of a recent invoice (for example the invoice of his mobile phone)

Security policy may comprise a limited access to the personalization data, as a maximum number of access (the user may have the right to see the PIN/PUK code only once) or limit in time.

The pairing between the secure element and the user's data or UICC permits to guarantee that only this user will have access to the confidential data.

The deployment of the storage media can then be delivered through any means that does not need to be secured. The security of the solution relies on the secure element (UICC) located in the mobile phone.

Scratch codes, secure mail or hand-to-hand delivery can thus be avoided.

The storage media is not necessarily a dongle or a SD card, it can also be:

A NFC tag holding all the confidential data, read by the mNFC UICC;

A magnetic stripe holding the confidential data, read through the magnetic stripe reader of the mobile phone;

Regular mail holding the data encrypted in a bar code, read through the camera of the mobile phone.

The sixth improvement concerns embedded UICCs (not removable). In a first embodiment, the improvement is about a method using NFC to select and download an embedded (U)SIM application (or generally speaking a complete UICC application) to a terminal comprising such an embedded secure UICC. The terminal is for example a mobile phone.

In a second embodiment, the improvement is about a method using a barcode for identifying a (U)SIM application (or generally speaking a complete UICC application) to be downloaded to a terminal able to take a photograph of this barcode.

As already explained in the introduction, in the future, when there are soft SIMs or embedded SIMs inside devices, it will be necessary to select the appropriate subscription information to download to the device. The user experience could be improved by giving a single-use NFC tag identifying the subscription for the device to download.

Said otherwise, in a world where the subscription information is no longer stored in a secure removable format such as today's UICC and instead stored as a "soft SIM" or soldered secure element (e.g. a VQFN8/DFN8 secure element) then there is a need to select the correct subscription to download to the device.

The improvement proposes a method for downloading a subscription in an UICC embedded in a terminal, this method consisting in:
- transferring an ICCID to the terminal;
- sending the ICCID over an IP link to a secure vault;
- selecting in the secure vault a subscription corresponding to the ICCID;
- transmitting the subscription to the terminal over the IP link;
- storing the subscription in the terminal.

The ICCID is preferably transferred along with a ICCID's secret activation code and the secure vault verifies the pairing of the ICCID and the secret activation code before transmitting the subscription to the terminal.

In a first embodiment, the ICCID is contained in a token and the ICCID is transferred to the terminal via NFC.

The token can be constituted by a NFC tag.

In a second embodiment, the ICCID is contained in a barcode to be photographed by the terminal.

According to the first embodiment of the present improvement, a NFC terminal is used.

The download of the subscription could be done through the user interface or in a push way. However, for terminals that are unlocked, a need is present (for MNO processes with legacy flows) to have a physical tag/NFC card to distribute similar to today's physical SIM card. This tag would contain a reference to the ICCID (with a security activation code known to the provisioning system and linked to an individual ICCID). Once the ICCID is submitted to the provisioning system with the correct activation code, the remote provisioning service can begin the secure transfer of the correct software (SIM profile, subscription information) for the embedded secure element.

If for example, a user has a pre-activated device X and want to buy a subscription from operator A, the flow would be as follows:

If for example, a user has a pre-activated device X and want to buy a subscription from operator A, the flow would be as follows:
- Device X is touched against NFC token Y. The token contains the ICCID and preferably also the ICCID's activation code. Device X reads the ICCID from token Y as well as (preferably) the ICCID's secret activation code which is unique (this code prevents brute-force guessing of ICCID requests to the provisioning centre).
- Device X sends this ICCID over an IP link to a secure vault. The secure vault verifies the ICCID/secret activation code pairing and if valid it securely packages, encrypts and signs the entire personalisation script for the related embedded UICC (containing SIM application, USIM application, ISIM application, CSIM application, any other network authentication applications as well as any SIM application Toolkit applications and Operating System Customisations/mechanisms related to that specific MNO) as well as the relevant subscription information such as the IMSI, K, Opc, IMPU and algorithm constants. The contents of the profile would be known to the secure vault using the ICCID range or alternatively a profile code could be submitted to the system.
- The secure vault transmits the above personalisation script to device X encrypted for Device X's embedded secure element (and with an anti-replay counter mechanism included) over the IP link.
- Device X (including its embedded secure element) decrypts and runs the personalisation script thus provisioning the subscription onto the embedded secure element.
- Device X may now access the radio network using the subscription.

In a second embodiment, the ICCID is contained in a barcode to be photographed by the terminal. After having taken a picture of the barcode, the terminal sends it to the secure vault. The secure vault then compares the received barcode with pre-registered barcodes or decodes the barcode for retrieving the ICCID. The same process as mentioned above is then undertaken.

The improvement allows selection of subscription as well as profile variant remotely and makes the user experience very easy.

The seventh improvement relates to a method for transferring a subscription from an embedded secure element (embedded UICC) to a physical card (removable UICC).

In the future, when there are soft SIMs or embedded SIMs inside terminals, it will be necessary to transfer the subscription information (IMSI, Ki, Opc, phonebook etc) between a terminal with an embedded secure element and a terminal with a classical SIM slot in 2FF/3FF format.

In the state of the art, to solve this problem, it is unavoidable to buy a new SIM card that is re-paired by the operator re-pairing it. This leads frequently to a loss of user data.

The present improvement proposes a solution to this problem by proposing a method for transferring securely subscription and user data (content) between an embedded UICC and a removable UICC.

To this purpose, the present improvement proposes a method for transferring securely a Sim profile comprising subscription and user data between a UICC embedded in a terminal and a removable UICC, the method consisting in:
- Connecting the terminal to a personalisation station comprising blank removable UICCs, to each removable UICC being associated a private and a public key;
- Transferring the public key of a removable UICC to the embedded UICC;
- Encrypting the Sim profile for export by using the public key;
- Transferring the encrypted Sim profile to the removable UICC;
- Decrypting the packaged Sim profile by using the corresponding private key in the personalisation station;
- Installing the Sim profile on the removable UICC.

Alternatively, the improvement proposes a method for transferring securely a Sim profile comprising subscription and user data between a UICC embedded in a terminal and a removable UICC, the method consisting in:
- Connecting the terminal to a personalisation station comprising blank removable UICCs, to each removable UICC being associated a fixed master key;
- Transferring the master key of a removable UICC to the embedded UICC;
- Encrypting the Sim profile for export by using the master key;
- Transferring the encrypted Sim profile to the removable UICC;
- Decrypting the packaged Sim profile by using the corresponding master key in the personalisation station;
- Installing the Sim profile on the removable UICC.

The present improvement will now be described in a particular environment.

At point of sale, a mini-personalisation station comprises blank cards belonging to a MNO. The station comprises a master key known to the personalisation system.

If the user of a terminal containing an embedded UICC wants to downgrade to a terminal having a Sim slot (i.e. a terminal where a removable UICC can be inserted), the flow would be as follows:

- The terminal is connected to the personalisation station. This connexion can be wired or wireless, for example through a NFC link. The personalisation station comprises blank removable UICCs, to each removable UICC being associated a private and a public key;
- The public key of a given removable UICC is then transmitted to the embedded UICC;
- The embedded UICC then proceeds to encrypt and package the entire contents of the embedded Sim profile (including the profile, applications, keys) using the public key of the new physical SIM that is in the personalisation station. This corresponds to an encryption of the Sim profile of the embedded UICC for export;
- The encrypted Sim profile is then transmitted to the removable UICC contained in the personalisation station. This can be done by transferring the data (containing the packaged perso script APDU commands for the new card) either by opening an IP channel to the personalisation station (if available) or alternatively over an NFC or cable interface.
- The packaged Sim profile is then decrypted by the removable UICC by using the corresponding private key in the personalisation station. The Sim profile can then be installed on the removable UICC;
- Finally, the removable UICC is given to the user. It can now be placed in a terminal supporting the classic SIM plug.

It is also possible to use a master key in the personalization station. Then, all the UICCs in the personalization station have the same master key and it is used for the symmetric encryption of the profile as well as decryption of the profile within the removable UICC holding the corresponding master key (inside the personalization station).

This improvement allows the transfer of subscriptions peer to peer between an embedded secure element and a classical SIM without passing by an OTA server.

The eighth improvement concerns a method for transferring a subscription between terminals with embedded secure elements (embedded UICCs) storing subscription information over NFC.

In the future, when there will be soft SIMs or embedded SIMs inside terminals, it will be necessary to transfer securely the subscription information (IMSI, Ki, Opc, user data like the phonebook, etc) from one terminal to another (for example by touching them together), in order to avoid reprovisioning the IMSI, Ki, Opc over-the-air into the new terminal using remote personalisation.

Today, if a user wants to change his mobile terminal, he can simply extract the UICC card from his old terminal to insert it in the new one. But this is not possible if the new one does not have a slot for inserting the Sim card (i.e. has an embedded UICC) or if the format of the UICC does not fit to the new terminal. The same problem occurs if the old terminal contains an embedded secure element: the Sim application cannot be extracted manually.

The present improvement proposes to solve this problem.

The present improvement concerns a method for transferring securely the subscription information and user data from a first terminal to a second terminal, the terminals respectively containing a first and a second UICC. According to the improvement, the method consists in:

i—transmitting an identifier of the second terminal to the first terminal;

ii—transmitting from the first terminal to a secure vault the identifier of the second terminal and an identifier of the first UICC;

iii—transmitting from the secure vault to the first terminal a subscription installation public key of the second terminal;

iv—in the first UICC, packaging and encrypting the subscription information and user data with the subscription public installation key of the second terminal;

v—transmitting the package to the second UICC of the second terminal;

vi—installing the package on the second UICC.

Steps i and v are preferably executed over NFC.

The improvement preferably applies to embedded UICCs (non removable).

The following description is a use case where subscription information and user data are transmitted over NFC from a first to a second terminal.

If for example, a user has a terminal X (first terminal) and wants to upgrade to a terminal Y (second terminal), the flow would be as follows:

- Device X is touched against Device Y. A menu appears on Device X presenting the user a set of options, one of which is "transfer subscription".
- Device Y receives a pop-up on the user interface confirming if a new subscription should be installed. This must be approved. Device Y returns its IMEI to Device X over NFC.
- Device X sends its IMSI together with Device Y's IMEI over the radio network to a secure vault. The secure vault stores Device Y's subscription installation key which is encrypted and returned to Device X (if authorised).
- Device X then packages, encrypts and signs the IMSI, K, Opc plus user data securely with Device Y's key.
- A notification appears on Device X's screen prompting the user to re-tap the devices to complete the transfer.
- Device X securely transfers the subscription information to Device Y over NFC and once installed device Y alerts the secure vault of the change (in order to confirm the transaction has taken place).
- Device Y may now access the radio network using the subscription.

It is also possible to establish a Bluetooth communication between the two terminals or any other channel. Using Bluetooth requires however pairing, exchange of keys etc.

The improvement allows transfer of subscriptions remotely without passing by an OTA server (only contact with network is needed for authorisation/key exchange/notification of completion of the subscriptions).

In another use case, if Device Y does not have the same profile/capabilities installed as Device X, the secure vault can do a remote personalization of the UICC in Device Y. In this case, it requests Device X to package its profile in its current state (including profile, subscription, keys, user data etc) and upload it to the secure vault. In the case where the two secure elements are not compatible or are different versions, the virtual profile would have to pass through the secure vault and then be transformed for Device Y's different embedded UICC and then repersonalized for the Device Y.

The ninth improvement concerns a warm switch between logical UICCs.

An UICC is:

1) a physical component compliant to a standardized form factor (e.g. 3FF) embedding a chip 2) A smartcard Operating System executed on the chip providing standard services: answer to ISO7816-3 reset, answers to standardized APDUs sent by a reader, . . . .

3) A set of applications executed on the chip providing answers to APDU defined by application provider 4) A set of personal data (e.g. phonebook, UICCID, IMSI) stored in the physical memory of the chip used by the smartcard OS 5) A set of secret data (keys and PINs) stored securely in a physical memory of the chip and used by the smartcard OS to provide secure services.

In this improvement, the physical component is the Physical UICC.

This Physical UICC can emulate several UICCs, each one having the behaviour described in 2) and 3), storing sets described in 4) and 5). This service is provided by embedding in the chip the 2), 3), 4) and 5) of each UICC emulated. An emulated UICC is hereinafter called 'Logical' UICC. Because of physical memory constraints (technology of the memory, limited amount of volatile and persistent memory) and Operating System constraints, part of the volatile and persistent data of different 'Logical' UICC are stored in the same location when they are executed. These parts of data are called overlapped volatile data and overlapped persistent data. This is the case, for example, for the volatile data of the 'Logical' UICC: they are stored in the limited amount of volatile memory of the physical UICC during the 'Logical' UICC execution time.

The UICC card can be considered from the external world (e.g. reader) as anyone of the 'logical' UICC that it emulates.

The improvement proposes a mechanism that allows fast and smart switching between logical UICCs.

In the state of the art, the basic behaviour to switch from a first 'logical' UICC to another one is to reset the (physical) UICC, and after the ISO7816-3 reset, execute the Operating System of the newly selected 'logical' UICC. During the reset, the volatile memory of the physical UICC is cleared and all volatile data of the first 'logical' UICC is lost. After this reset, the software of the 'logical' UICC is executed (as today in a usual UICC) from scratch: a complete activation sequence shall be performed by the reader. It is requested by 2) and 3) to initialize its volatile data in order to set up the applicative and system contexts. The volatile data of the newly selected 'logical' UICC are stored in the volatile memory of the physical UICC, at the same location used by the previously selected 'logical' UICC.

The volatile context of the 'logical UICC' previously selected is however lost. If a service from this 'logical' UICC is requested again, the 'logical' UICC shall be selected again, and the complete activation sequence shall be performed again. This may take a while and limit the use cases to switch between two logical UICCs.

From the reader (terminal, for example mobile phone, PDA or tablet) point of view, this solution is 'natural': as the UICC is a removable device, the UICC could have been removed and a new one could have been inserted. Modification of the UICC behaviour after the reset is normal. From the 'logical UICC' point of the view, the Operating System is executed (started) from a Reset and this is the normal behaviour.

The present improvement is a way to modify dynamically the contexts of 2) and 3) but avoid the initialization of volatile contexts.

The improvement proposes a method for switching between a first and a second logical UICCs comprised in a same physical UICC. In order to perform the switch, specific areas are defined to manage the overlapped volatile data and overlapped persistent data. each logical UICC comprising an area for storing overlapped volatile data and an area for storing overlapped persistent data. The physical UICC comprises also an OS area comprising in operation, during the 'logical' UICC execution time, the overlapped volatile data and overlapped persistent data.

According to this improvement, the method consists in, when a switch order is received to switch from the first logical UICC to the second logical UICC:

i—backup overlapped volatile data from OS area of the physical UICC to the area for storing overlapped volatile data of the first logical UICC ii—backup overlapped persistent data from OS area of the physical UICC to the area for storing overlapped persistent data of the first logical UICC iii—restore volatile data from the area for storing overlapped volatile data from the second logical UICC to the OS area for storing overlapped volatile data of the physical UICC iv—restore persistent data from the area for storing overlapped persistent data from the second logical UICC to the OS area for storing overlapped persistent data of the physical UICC.

Thanks to this improvement, from the reader (terminal) point of view, there is no change of UICC card. There is also no need to perform the activation sequence after the switch between the logical UICCs.

Figure 6:
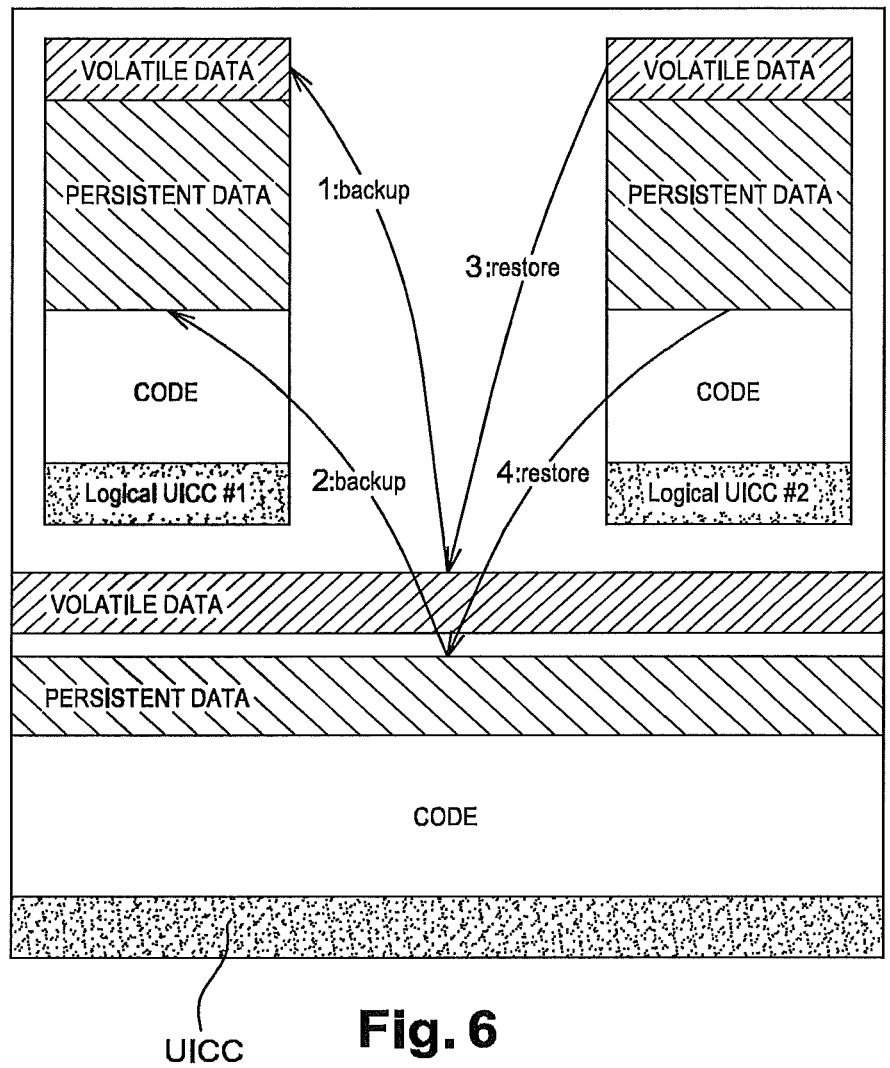
FIG. 6 is a block diagram of a UICC comprising two logical UICCs.

The improvement will be better understood by reading the following description of the FIG. 6 which represents a physical UICC comprising two logical UICCs between which a switch is performed.

The switch is performed thanks to a new design of 2) where the volatile contexts are backed-up and restored from/to persistent smartcard storage each time a warm switch is requested. Those persistent data are nevertheless cleared upon physical reset.

This creates a $3^{rd}$ kind of data in 2): volatile data persistent between logical UICC switches.

This switch operation can be performed each time an APDU is received. This APDU consists in a switch order to switch from the first logical UICC (UICC#1) to the second logical UICC (UICC#2). The UICC can be asked to switch from one logical UICC to another by several mechanisms. It may be a specific APDU command, an information set through the logical channel byte or any electric signal on the terminal/UICC interface (usage of a specific connector). The switch can also be automatic.

This mechanism can be entirely hidden from the reader (reader has no knowledge of 'logical' UICC switch).

Thanks to this improvement, it is easy (fast and transparent for end user and terminal) to switch from one logical UICC providing some services to another one providing other services.

In the telecom market, for example, a physical UICC contains:

a first 'logical' UICC for a MNO 1 subscription a second 'logical' UICC for a MNO 2 subscription a third 'logical' UICC for banking services.

The physical UICC allows the end user to connect to two different radio networks (e.g. UMTS or CDMA networks), for example one network in France and the other one in USA. Usage of the improvement allows benefiting from the banking services whatever MNO is selected.

FIG. 6 represents an UICC comprising two logical UICCs, a first logical UICC referenced UICC#1 and a second logical UICC referenced UICC#2. Each logical UICC comprises software (CODE), an area storing volatile data and an area storing persistent data. The UICC also comprises an area for storing volatile data (e.g. RAM) and an area for storing persistent data (e.g. NVM).

The method according to the present improvement proposes to switch between logical UICC#1 and logical UICC#2. This switch can be automatically done, for example in view of the MNO used by a calling party. If the logical UICC currently used is UICC#1 and the calling party's MNO is the second operator, it is advantageous, for avoiding roaming costs, to switch to UICC#2. For that, an APDU is sent from the terminal enclosing the physical UICC (removable or not) to this physical UICC.

Four steps are represented in FIG. 6.

In this figure, logical UICC#1 and logical UICC#2 are comprised on a physical UICC. Each logical UICC comprises an area for storing volatile data and an area for storing persistent data. The physical UICC comprises also an OS area comprising in operation volatile and persistent data. When a switch order is received to switch from the first logical UICC (UICC#1) to the second logical UICC (UICC#2), following steps are performed:
1. the volatile data from OS area of the physical UICC are backup to the area for storing volatile data of the first logical UICC
2. the persistent data from OS area of the physical UICC are backup to the area for storing persistent data of the first logical UICC
3. the volatile data from the area for storing volatile data from the second logical UICC are restored to the OS area for storing volatile data of the physical UICC
4. the persistent data from the area for storing persistent data from the second logical UICC are restored to the OS area for storing persistent data of the physical UICC.

The result of these operations is that logical UICC#2 is immediately ready to be used without terminal boot.

The tenth improvement concerns a way to notify an application executed on a UICC that it is going to be removed and exported out of the UICC, for example to be installed in another UICC, whether directly or through a host (server).

The invention takes place in an environment where subscriptions and related applications can be downloaded on UICC cards with a remote provisioning system.

On these UICC cards, different application could be installed and managed by the current MNO or by a third party (e.g. Transport or Banking application).

There is a need to move all data from a UICC card to another UICC card, and in particular the data of MNO and third party applications.

This can be done through proprietary solutions.

This invention concerns a method applicable to Javacard applications to be exported with the corresponding data from a UICC (removable or embedded) to a host, this host being for example another UICC.

The invention proposes a method for exporting data of a Javacard application stored in a UICC to a host, the method consisting in:
  transmitting a transfer order to the application through a Javacard API;
  formatting the data in a pack, wherein the formatting is realized by the application;
  exporting the pack to the host.

The host can be a remote server to which the pack is exported for being downloaded later, for example on another UICC.

The host can also be another UICC. In this case, the pack is directly transferred from a first UICC to a second UICC without intermediate.

The export can be managed by the host (the host retrieves the pack of data) or by the UICC (the UICC sends the pack of data).

The invention also proposes a method for importing a pack of data of a Javacard application stored in a host to a UICC, the method consisting in:
  transmitting a import order of the data to an application through a Javacard API, the application being located on the UICC;
  unpacking the data, wherein the unpacking is realized by the application.

An application programming interface (API) is an interface implemented by a software program that enables it to interact with other software. It facilitates interaction between different software programs similar to the way the user interface facilitates interaction between humans and computers.

The invention proposes to define a new Export/Import Javacard API that can be used by any applications based on the Javacard standards APIs. This new Export/Import Javacard API comprises at least one entry point to inform an application it should export its data and one entry point to inform an application that data have to be imported and which data. These entry points are invoked by the Operating System of the UICC if they are implemented by an application. An application implementing this new API can be deployed on any Javacard compliant UICC providing this API (independently of the card manufacturer), ensuring an easy interoperability. The entry point for export corresponds to a function of exporting the data of an application stored in a UICC, this UICC being for example embedded (not removable) in a terminal, for example a mobile terminal or a machine. The mobile terminal is for example a mobile phone. It is then possible to transfer data of an application from a first UICC to a second UICC, the second UICC comprising the same application than the first one. The second UICC will then be able to work with this application in the same environment than the first one, i.e. with the same data. The first and second UICC do not need to be of same UICC manufacturer.

When triggered by this event, the application takes necessary action to back up, inform or what it need with a remote server to keep the portability of the confidential user data associated to the application. (e.g. back up electronic purse credit).

When the data shall be moved from one UICC card to another, all applications on UICC implementing this API are preferably notified that it is going to be deleted from this UICC card and exported (for example on another one).

The method for exporting data of a Javacard application stored in a UICC to a host consists firstly in transmitting a transfer order to this application through a Javacard API. The transmission of this order can be done by the OS of the UICC, for example after a user's action in a menu of the GUI of the terminal.

The application itself then formats a pack of the data linked to this application. The pack is then ready to be exported to a host, for example to a remote server via an IP or link. The pack can also be directly transferred to another UICC, for example via NFC or Bluetooth.

The host can take the initiative to retrieve the pack from the UICC or the UICC can itself decide to export the pack of data.

The data pack is preferably transmitted in a ciphered manner to the host.

Once installed in the host, the exported pack can be retrieved to be installed on another UICC. In this respect, the invention proposes to transmit an import order of the data to the same application through an Export/Import Javacard API, the application being located on the UICC, and to unpack the data (the unpacking being realized by the application).

Since the application that has realized the formatting of the data pack in the first UICC is the same than the application in the second UICC that unpacks the data pack, the same environment is obtained at the level of the second UICC.

Once exported, the data and the application on the first UICC are deleted in order to avoid a duplication of the application and the data.

Thanks to the invention, as notified, an application or all the applications embedded in a UICC will be able to backup user confidential and portable data to a remote server.

The application takes care itself of which data shall be exported and how they are secured.

The invention is preferably applied to embedded UICCs, for example in order to transfer data of an application (e.g. a banking application) from a first UICC comprised in a first terminal to a second UICC comprised in a second terminal. The banking application is already installed in the second UICC when the transfer of data to this second UICC occurs or can be installed afterwards.

The eleventh improvement concerns a method for remotely delivering a full subscription profile to a UICC over IP. More precisely, the improvement concerns the delivery of a full subscription profile (including File System, Security Domains, Applications (STK, USIM, ISM, . . . ), unique data like Ki, applicative keys, . . . ) to a UICC embedded in a device using an HTTP transport OTI or OTA.

The improvement proposes to solve the following problem. Once a UICC is attached to a receiving device, for instance soldered, or simply not physically removable because of the device form factor, or because not economically viable (distance, . . . ), or when the device has to be commercialized without any attachment to a particular subscription (in order to give to the end-user the possibility to choose separately the device and the subscription), it is no longer possible to personalize the UICC at manufacturing stage with subscription profile.

The improvement proposes a way to perform the personalization of a UICC remotely, in a very secure way, when the UICC is already deployed on the market without low expectations regarding device functionalities (IP connectivity only). The MNO profile has to be downloaded via OTA or OTI since the UICC is already in the field.

The improvement proposes to use the HTTP protocol in order to personalize remotely a UICC.

More precisely, the improvement proposes a method for remotely delivering a full subscription profile to a UICC over IP, the UICC being installed in a terminal able to provide an IP connectivity to a remote server and give access to the UICC. The UICC is pre-personalised with a unique serial number and with a bootstrap application and bootstrap credentials allowing establishing a secure transport channel with the remote server. The remote server hosts a stock of subscription profiles and acts as a web server. According to the improvement, the method consists in:

opening, at the request of the UICC, a data channel between the terminal and the server;

performing a mutual authentication between the UICC and the server by using the bootstrap credentials;

requesting, from the UICC to the server, the delivery of a subscription profile by using the unique serial number;

if a subscription profile exists for the UICC, downloading the subscription profile to the UICC.

Preferably, the http communication protocol is used between the UICC and the remote server.

Advantageously, the UICC and the terminal communicate over a BIP channel.

Figure 7:
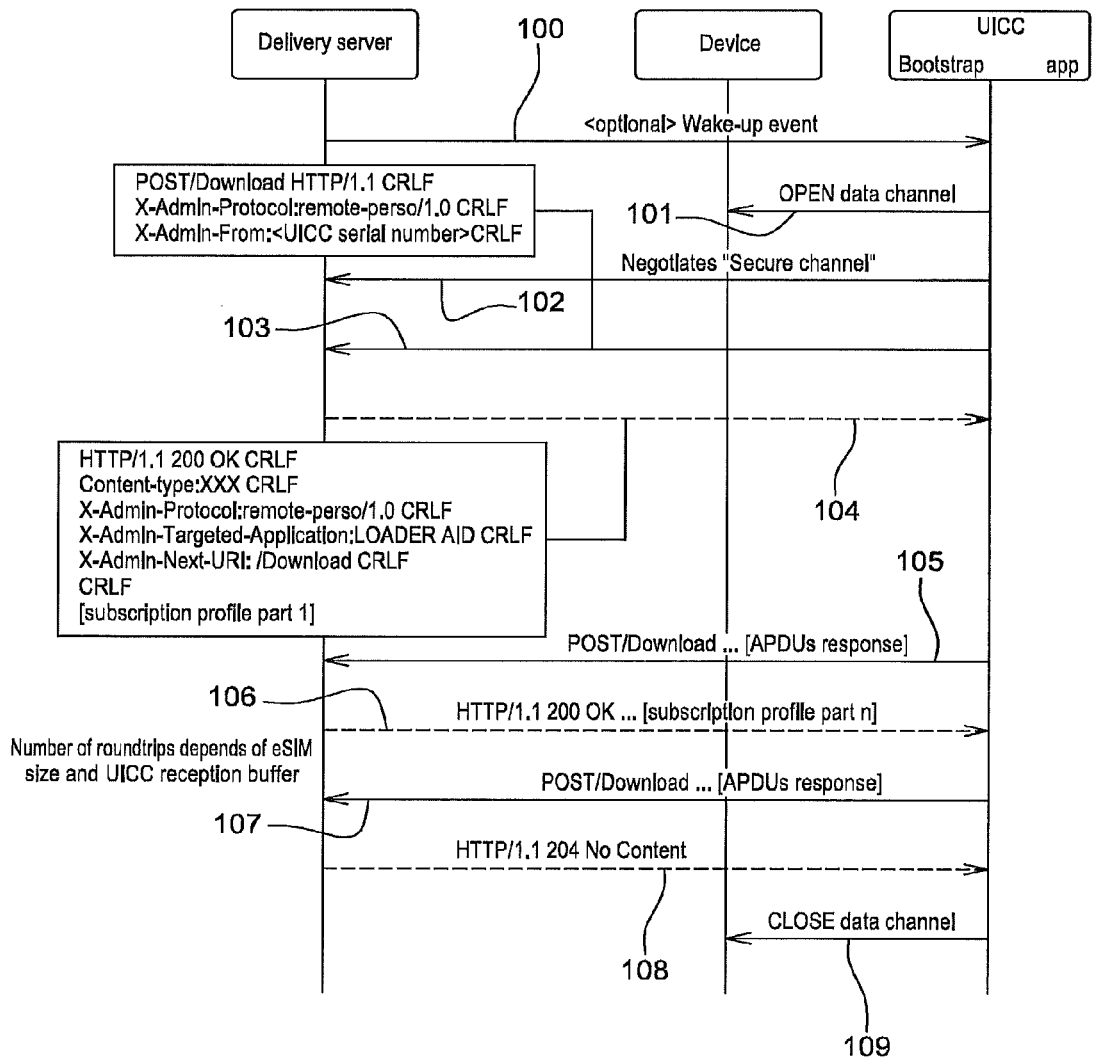
FIG. 7 is a flow chart of a second embodiment.

The present improvement will be better understood by reading the following description in relation to FIG. 7 that describes the overall overflow of an embodiment of the improvement.

This improvement requires:

a UICC pre-personalised with a unique serial number and with a bootstrap application, bootstrap credentials allowing to establish a secure transport channel with a remote server entity;

a remote Delivery server which role is to host and deliver a stock of subscription profiles and acting as a simple web server;

a device (terminal) able to provide an IP connectivity to the remote server and give access to the UICC, for instance through a BIP interface. The connectivity may be provided by any of these methods for instance: wired, WIFI, OTA through a pre-loaded UICC subscription which role is to only provide initial data connection.

The diagram of FIG. 7 presents the overall flow.

At the beginning of the sequence we assume that the subscription profile for the UICC has been determined and reserved in the Delivery server.

At step 100, optionally, the Delivery Server may send to the UICC a wake-up event to triggers UICC connection. This may also be achieved simply by the UICC itself at power on, or by a periodic connection.

At step 101, the UICC requests the device to open a data channel. At this stage the UICC may provide connectivity information. A preferred method would be a BIP OPEN CHANNEL command.

At step 102, the UICC negotiates the opening of a secure channel with the Delivery Server using its pre-loaded credentials. A preferred method would be the establishment of a SCP 81 (PSK-TLS) channel as defined in Global Platform. During this step, a mutual authentication occurs between the UICC and the Delivery server and the integrity of the exchanged data can be verified.

At step 103, the UICC sends a first HTTP POST request to the delivery server using a pre-defined (or configurable) URL, requesting the delivery of the subscription profile. This request shall at least comprise the UICC serial number. The POST request in the diagram is given as example.

The Delivery Server then checks if a subscription profile is available for this UICC. If yes, at step 104, the Delivery server returns an HTTP 200 OK response with the subscription profile as body of the answer. In case no subscription profile is available for this UICC a 204 No content response shall be returned.

The UICC then receives the HTTP response and executes the loading of the subscription profile. At step 105, the UICC sends a second HTTP POST request on the URL given as NEXT-URI in the server response. This POST shall include loading execution status.

In case the UICC is not able to receive in a single answer the whole subscription profile, it may be required to perform several round-trips between UICC and delivery server (steps 106 and 107).

The sequence shall end when the whole subscription profile has been delivered. In that case the last Delivery Server HTTP response shall indicate a 204 No content (step 108).

At step 109, the UICC closes the data channel established with the device.

This method may also be applicable to an UICC not physically attached to the device (removable UICC).

HTTP protocol is preferably used for communicating with the delivery server, and BIP protocol for the communications between the UICC and the device.

The twelfth improvement concerns a centralized service that can notably be used for lost or stolen mobile devices.

This improvement aims to simplify procedures for a user that has lost his mobile phone and who has multiple subscriptions on the UICC it contains. The UICC can be removable or not.

Today it is more and more common for a user to have multiple telecommunications subscriptions available on his mobile. Several examples can be mentioned:

Mobile phones featuring multiple UICC slots;

The dual IMSI cards that allow two different subscriptions (e.g.: one personal and one professional subscription or two (or more) subscriptions from different countries for cross-border workers);

In Brazil, it is mandatory to have an emergency call on all new vehicles. They are equipped with so called white SIM pre-loaded with one subscription for each MNO of the country.

With several subscriptions in his UICC, it is a burden for the user to call all hotlines from different operators to block all his subscriptions, if his mobile device has been stolen or lost.

In addition, as in the Brazilian case, the user may not even know (or have forgotten) the activated subscriptions from all the pre-loaded subscriptions on his device.

Figure 8:
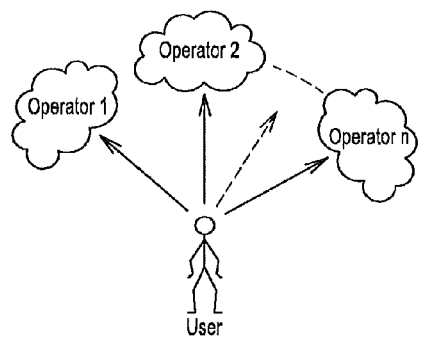
FIG. 8 is a representation of a user having multiple subscriptions with different operations.

This situation can be described by FIG. 8 which is self-explanatory.

The improvement proposes to provide a unique centralized service for lost and stolen mobile phones that will be able to perform an action on mobile device on the user's behalf.

The improvement proposes a system for managing multiple subscriptions in a UICC, the system comprising a central server able to manage subscriptions stored on a UICC comprised in a mobile terminal in the field, at the request of a subscriber of one of these subscriptions.

Preferably, the central server is connected to a plurality of MNOs.

In another embodiment, the central server is connected to a unique MNO.

The management request is preferably made from the subscriber to the central server.

In another embodiment, the management request is made from the subscriber to one of the MNOs.

Preferably, the management of subscriptions consists in at least one of the following tasks:

Temporarily or definitively block one or several subscriptions;

Temporarily or definitively block one or several services from one or several subscriptions;

Send short message to try to warn with the person handling the terminal;

Geo-localize the terminal;

Recovery of the data on the device and the UICC;

Deletion or encryption of the data on the terminal;

Selection of a specific application that will allow to re-activate one of several subscriptions if the terminal is recovered.

The improvement proposes a system for managing multiple subscriptions in a UICC, the system comprising a central server able to manage subscriptions stored on a UICC comprised in a mobile terminal in the field.

Figure 9:
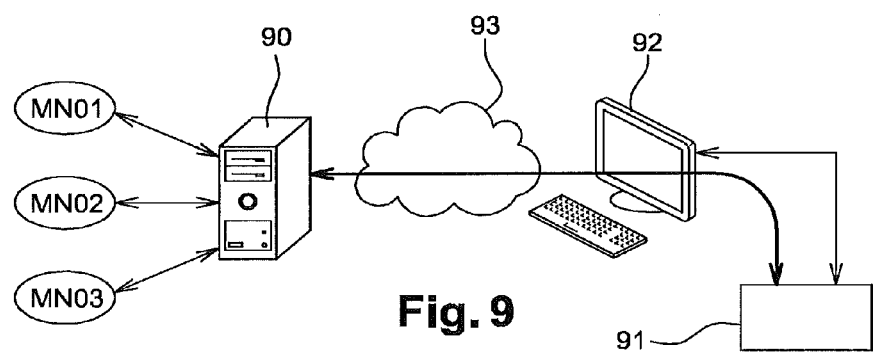

FIG. 9 represents such a system.

In FIG. 9, a central server 90 manages subscriptions stored in a UICC 91 comprised in a terminal 92. The central server 90 manages these subscriptions through a network 93, for example Internet. Central server 90 is connected to different telecommunication networks of operators MNO1 to MNO3.

Figure 10:
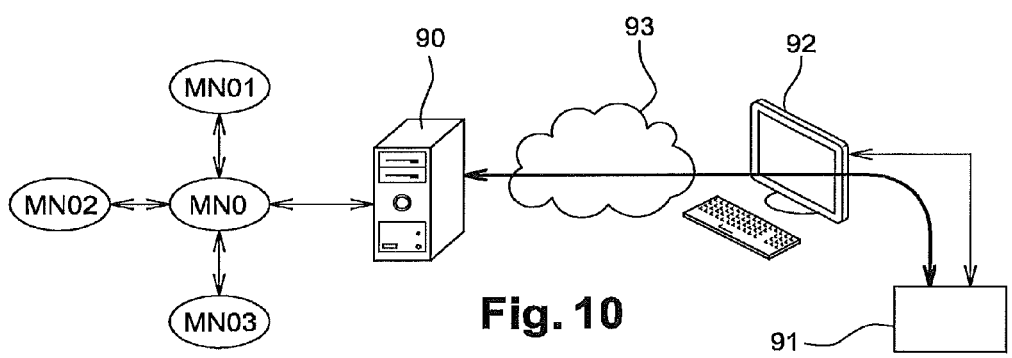

In another configuration of the system represented in FIG. 10, the central server is connected to a single operator's network (MNO) and communicates with the other networks MNO1 to MNO3 through this network MNO.

Central server 90 can act as a manager of the subscriptions present on UICC 91. He can for example install a new subscription on the UICC, at the request of the user of terminal 92.

The system according to this improvement allows a user that has lost his terminal to contact a single entity, the central server 90, in order to ask to this entity to manage its subscriptions. Such a management of subscriptions can for example consist in:

Temporarily or definitively block one or several subscriptions;

Temporarily or definitively block one or several services from one or several subscriptions;

Send short messages to try to warn the person handling the terminal;

Geo-localize the terminal;

Recovery of the data on the device and the UICC;

Deleting or encrypting the data present on the terminal;

Selecting a specific application that will allow to re-activate one of several subscriptions if the terminal is recovered.

This management also applies in case of a stolen terminal.

Figure 11:
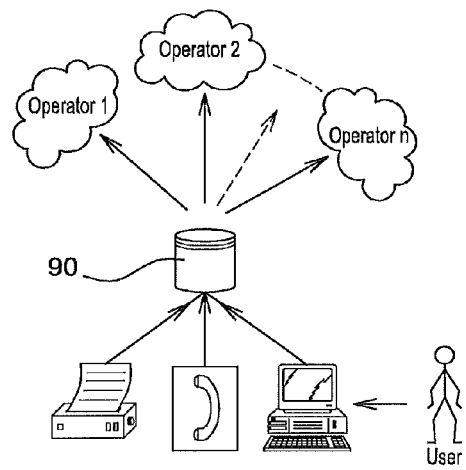
FIGS. 9-14 are schematic diagrams of systems for managing multiple subscriptions in a UICC.

In order to contact the central server 90, the user can contact directly the central server 90, as shown in FIG. 11. He can contact the server 90 by fax, phone or over the Internet. Since the server 90 knows which subscriptions have been installed on the lost/stolen UICC, it will be able to take the appropriate actions, at the request of the user.

An alternative for the user is to contact one of his MNOs who will warn the central server 90. The latter will take the appropriate actions.

Figure 12:
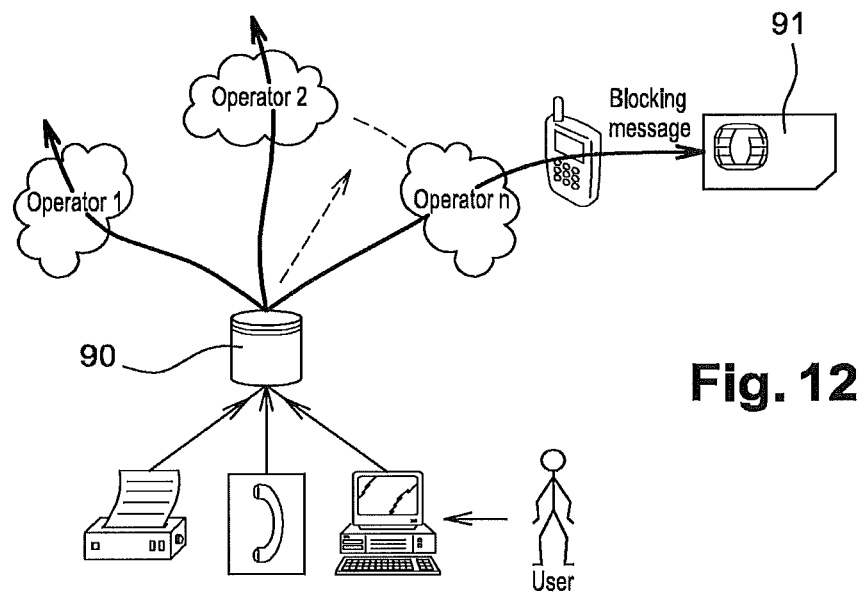
Figure 13:
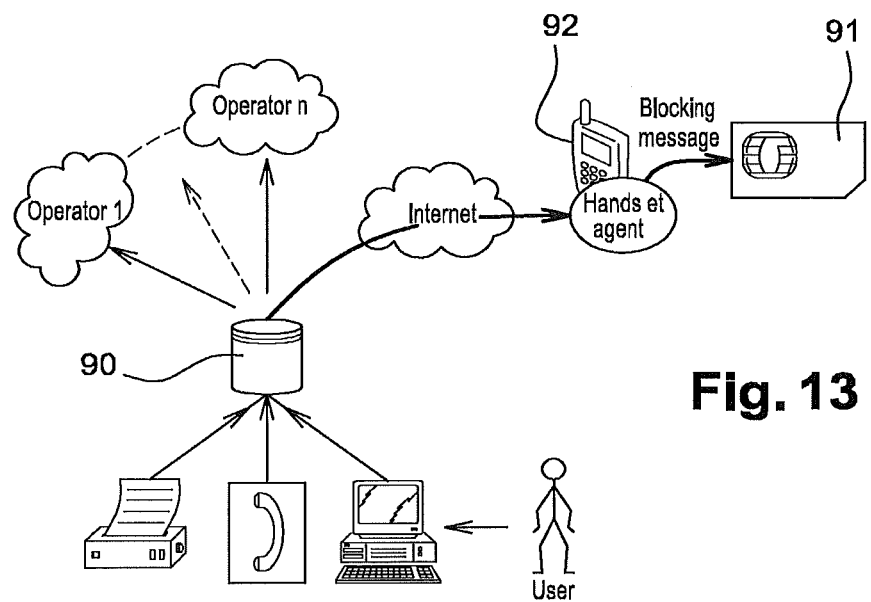

Alternatively, as shown in FIG. 12, the central server 90 may try to send a short message to a specific application located in the UICC 91 that will directly perform the action on the UICC 91 instead of performing it in all the networks. As the central server 90 may not be aware of the currently active subscription (and the associated MSISDN), it will try to reach the UICC with all the potential MSISDN A third alternative depicted in FIG. 13 would be to reach the UICC 91 via another network than a 2G/3G one like Wi-Fi or even a wired network. In this case, the central server 90 will try to reach an agent on the terminal 92 that will forward the messages to the UICC 91 and perform actions.

The main advantage of the improvement is that it provides a convenient and fast way to block all subscriptions related to lost or stolen mobile terminals.

The thirteenth improvement concerns simlock and applies to UICCs that are not removable from terminals (embedded UICCs), for example mobile terminals.

Mobile network operators (MNOs) often propose cheap mobile terminals to their subscribers and they do not want them to take subscriptions from other operators, at least for a given period of time after they have bought a new terminal. Therefore, operators lock new sold mobile terminals to their network, to be sure that they will only work on their networks, thanks to UICCs belonging to these operators.

It is however easy for an unfaithful user to desimlock his mobile terminal. Some shops propose for small amounts of money to desimlock recently bought mobile terminals. The desimlocked terminal can then be used on the network of another operator. This represents an important loss of money for the mobile operators since they have sold the terminals with an important discount price in exchange of the fidelity of their subscribers.

The present improvement is in particular applicable to mobile terminals comprising an embedded UICC (not removable) which can store at least two subscriptions, one for a MNO#1 (primary MNO who has sold the terminal) and another one, let's say for a MNO#2. MNO#1 who has locked the terminal on his network does not want that the user installs another subscription from another operator on his UICC. This would permit to the user to use his mobile terminal with this other subscription with MNO#2, instead with the subscription with MNO#1.

The present improvement proposes a solution to this problem.

The present improvement proposes a method for downloading a subscription from an operator to a UICC embedded in a terminal, the method consisting in:
  transmitting from the terminal to a platform an identifier and a request for downloading the subscription;
  verifying in the platform that the terminal is authorized to download the subscription by verifying the rights of the terminal thanks to its identifier;
  downloading the subscription to the UICC if the rights are confirmed and, otherwise, refusing to download the subscription.

The verification preferably consists in comparing the identifier with a list of subscriptions for which a download is authorized.

The identifier is an identifier of the terminal or an identifier of the UICC.

Figure 14:
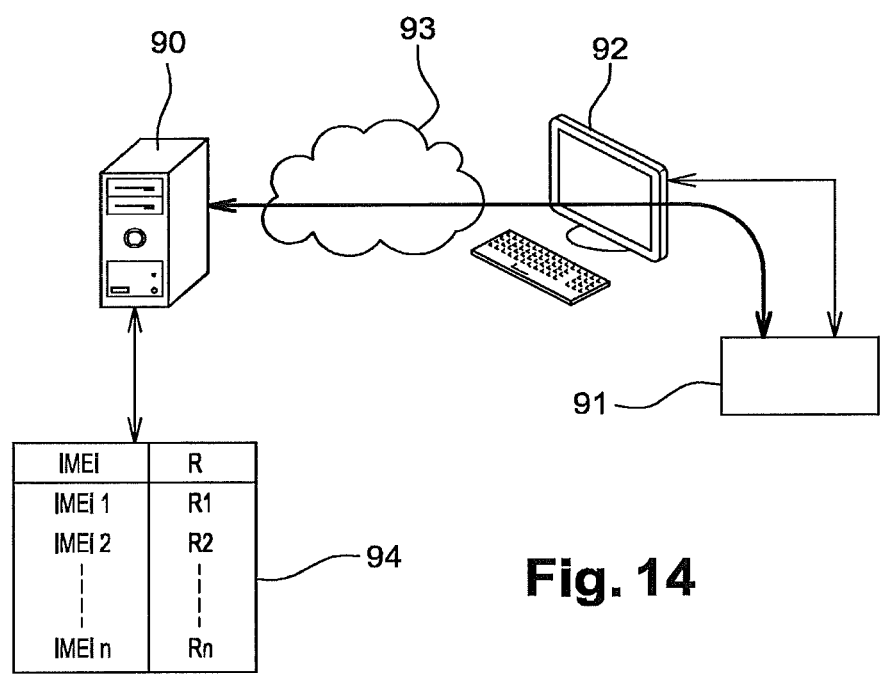

The present improvement will be better understood in reference to FIG. 14 which represents a system according to the present invention.

The system of FIG. 14 is similar to the system of FIGS. 9 and 10 already described, in which a central server 90 (constituted by a platform) manages subscriptions stored in a UICC 91 comprised in a terminal 92. The central server 90 manages these subscriptions through a network 93, for example Internet. Central server 90 is connected to different telecommunication networks (not represented) of operators or to a single operator's network and communicates with the other networks through this network.

Central server 90 can act as a manager of the subscriptions present on UICC 91. He can for example install a new subscription on the UICC, at the request of the user of terminal 92.

According to this improvement, in order to download a subscription in the UICC 91, the terminal 92 sends a request for downloading the subscription to the central server 90, this request comprising an identifier of the terminal 92 or an identifier of the UICC 91. The central server 90 comprises a list 94 of all the identifiers of the terminals or UICC that can be managed by this server 90.

The list 94 comprises for each identifier (here the IMEI of the terminal 90) corresponding rights R. To an identifier IMEI1 are associated rights R1. The server 90 verifies that a terminal (UICC) making such a request for downloading a subscription has the right to download this subscription. If the rights are confirmed, the subscription is downloaded to the UICC. If the rights are not allowed, the subscription is not downloaded.

The UICC can comprise a bootstrap subscription allowing a first connexion to the server, in order to download a real subscription afterwards.

Normally, the sold UICC already comprises a subscription to a first MNO and is locked to this operator. The operator can inform the central server 90 when locking is no more necessary and the list 94 is then updated in order to allow the customer to download another subscription.

Instead of verifying the rights associated to a terminal, the rights associated to a UICC can be checked.

Like described in regard to FIGS. 4 and 5, the UICC reference can be used for securing the channel between the terminal 92 and the server 90.

The server 90 can be managed by a unique entity, like for example a card manufacturer, who knows what is stored on each card.

The invention claimed is:

1. A method for personalizing a first secure element embedded in a first terminal, said first secure element being an embedded Universal Integrated Circuit Card, said method comprising:
  providing the user of said first terminal with a second secure element ent not embedded in any telecommunication terminal, wherein said second secure element contains an application;
  linking said first and second secure elements in or through said first terminal; and
  personalizing securely said first secure element with data comprised in said second secure element comprising transferring said application contained in said second secure element to said first secure element, security being based on certificate verification and asymmetric encryption between said secure elements.

2. A method according to claim 1, wherein said second secure element is a subscriber identity module (SIM) card.

3. A method according to claim 1, wherein said second secure element is a dongle.

4. A method according to claim 3, wherein said dongle contains credentials to be transferred to said first secure element.

5. A method according to claim 3, wherein said linking of said first and second secure elements is realized through a computer in which said dongle is inserted.

6. A method according to claim 1, wherein said second secure element is a banking card.

7. A method according to claim 1, wherein said application contained in said second secure element is transferred to said first secure element via near field communication (NFC).

* * * * *